US 011962925 B2

(12) United States Patent
Nakamura

(10) Patent No.: US 11,962,925 B2
(45) Date of Patent: Apr. 16, 2024

(54) PHOTOELECTRIC CONVERSION APPARATUS HAVING ANALOG-TO-DIGITAL CONVERSION BASED ON SIGNAL CHARGE, IMAGE CAPTURING SYSTEM, AND MOVING BODY

(71) Applicant: CANON KABUSHIKI KAISHA, Tokyo (JP)

(72) Inventor: Kohichi Nakamura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/311,682

(22) Filed: May 3, 2023

(65) Prior Publication Data

US 2023/0276145 A1    Aug. 31, 2023

Related U.S. Application Data

(62) Division of application No. 17/180,563, filed on Feb. 19, 2021, now Pat. No. 11,678,086.

(30) Foreign Application Priority Data

Feb. 28, 2020    (JP) ................................ 2020-033819

(51) Int. Cl.
*H04N 25/75* (2023.01)
*H04N 25/57* (2023.01)
(Continued)

(52) U.S. Cl.
CPC ............ *H04N 25/75* (2023.01); *H04N 25/57* (2023.01); *H04N 25/583* (2023.01); *H04N 25/771* (2023.01); *H04N 25/79* (2023.01)

(58) Field of Classification Search
CPC .... H04N 5/353; H04N 5/355; H04N 5/35554; H04N 5/3559; H04N 5/37452;
(Continued)

(56) References Cited

U.S. PATENT DOCUMENTS 7,777,170 B2 *   8/2010   Murakami .......... H03M 1/1023
                                                   341/169
2007/0035649 A1*  2/2007   McKee ................. H04N 25/59
                                                   348/E3.018
(Continued)

FOREIGN PATENT DOCUMENTS

CN    102215351 A    10/2011
CN    103369260 A    10/2013
(Continued)

OTHER PUBLICATIONS

Tong Jian-ping et al; "Nonlinear Correction of Optoelectronic Array Sensor;" Acta Metrologica Sinica; vol. 40, No. 3; May 2019; pp. 1-5.
Manuel Innocent, et al. "Pixel with nested photo diodes and 120 dB single exposure dynamic range," pp. 13, Jun. 2019/.

*Primary Examiner* — Lin Ye
*Assistant Examiner* — Chriss S Yoder, III
(74) *Attorney, Agent, or Firm* — CANON U.S.A., INC.

(57) ABSTRACT

A photoelectric conversion apparatus includes a pixel, an A/D conversion portion and an output circuit. The pixel includes first and second photoelectric conversion portions and an accumulation portion configured to accumulate a signal charge in a location other than the photoelectric conversion portions. The A/D conversion portion is configured to perform A/D conversions on signals based on signal charges generated in the photoelectric conversions. The output circuit reads out first and second signals based on first and second signal charges accumulated in the first and second photoelectric conversion portions during an electric charge accumulation period and a third signal based on a third signal charge generated in the second photoelectric conversion portion and accumulated in the accumulation portion during the electric charge accumulation period. Conversion periods for analog-to-digital conversion to be
(Continued)

performed on at least two of the first, second, or third signals have different lengths.

37 Claims, 24 Drawing Sheets

(51) Int. Cl.
 *H04N 25/583* (2023.01)
 *H04N 25/771* (2023.01)
 *H04N 25/79* (2023.01)

(58) Field of Classification Search
 CPC .... H04N 5/37457; H04N 5/378; H04N 5/379; H04N 9/0451; H04N 9/0455; H04N 25/11; H04N 25/53; H04N 25/57; H04N 25/583; H04N 25/59; H04N 25/75; H04N 25/771; H04N 25/778; H04N 25/79; H04N 23/84
 See application file for complete search history.

(56) References Cited

U.S. PATENT DOCUMENTS

| | | |
|---|---|---|
| 2009/0159782 A1 | 6/2009 | Murakami |
| 2013/0229543 A1 | 9/2013 | Hashimoto |
| 2017/0272675 A1 | 9/2017 | Kobayashi |
| 2017/0324917 A1 | 11/2017 | Mlinar |
| 2018/0006659 A1* | 1/2018 | Hashimoto ............ H04N 25/75 |
| 2019/0273879 A1* | 9/2019 | Xu ...................... H04N 25/585 |

FOREIGN PATENT DOCUMENTS

| | | |
|---|---|---|
| JP | 2009-165186 A | 7/2009 |
| JP | 2013211832 A | 10/2013 |
| JP | 2014075767 A | 4/2014 |
| JP | 2019062398 A | 4/2019 |
| WO | 2015115224 A1 | 8/2015 |
| WO | 2017018215 A1 | 2/2017 |

* cited by examiner

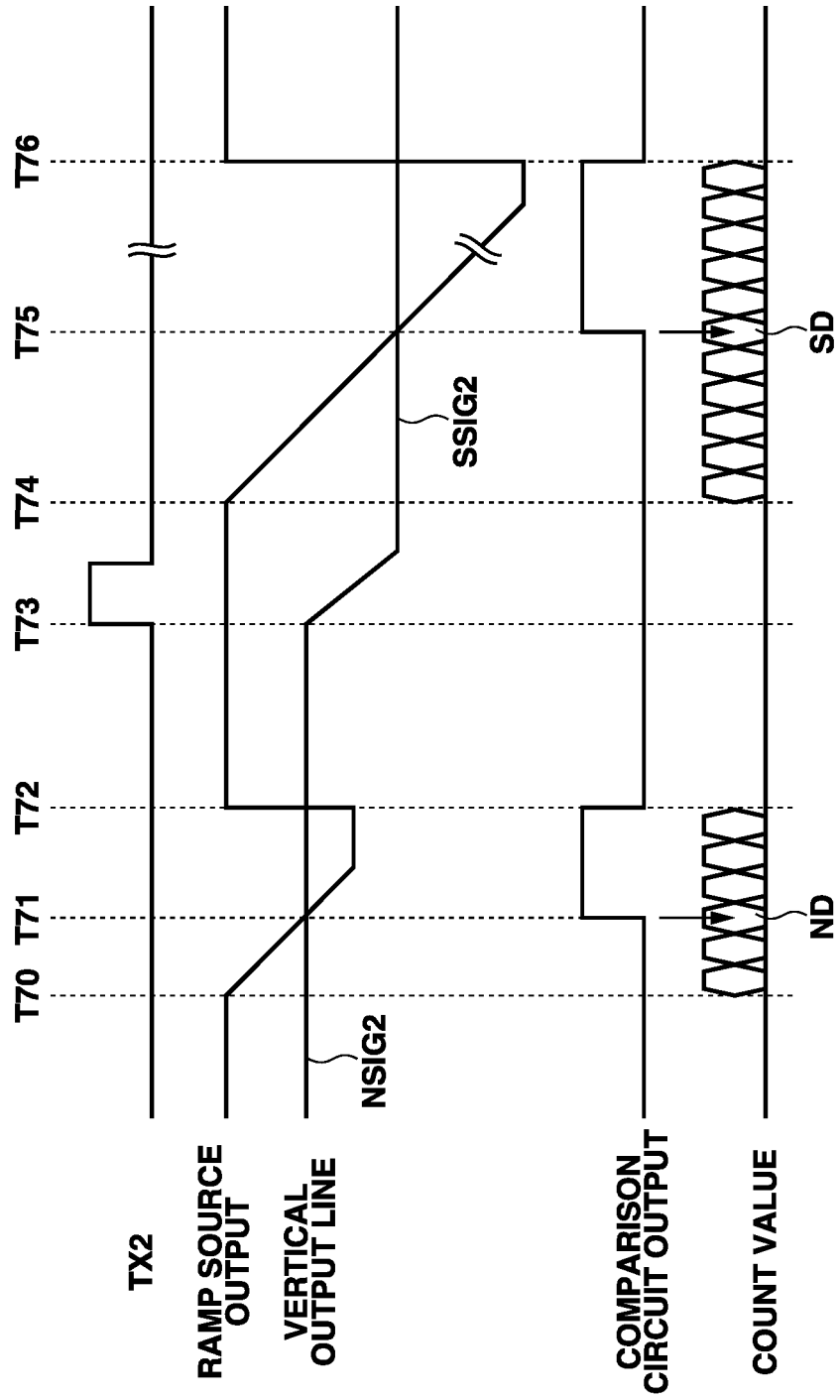

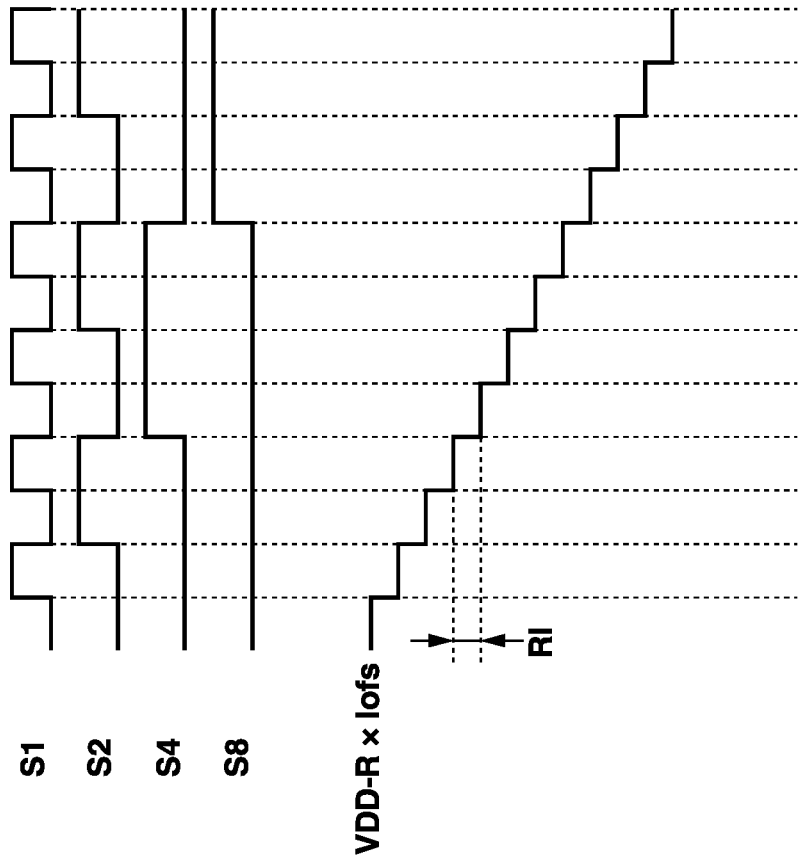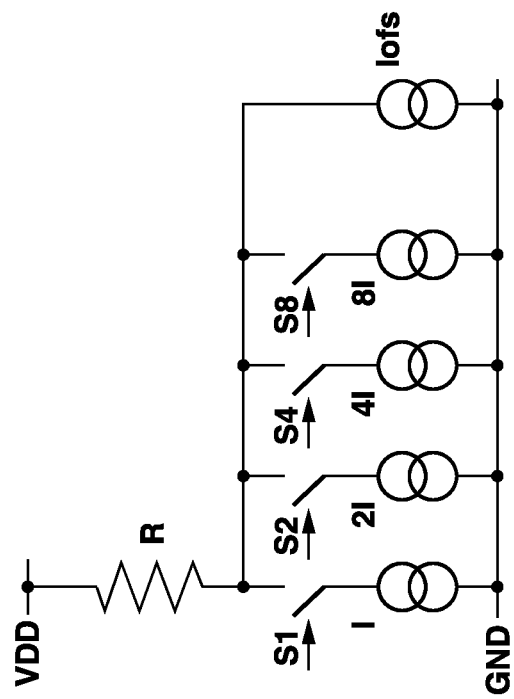

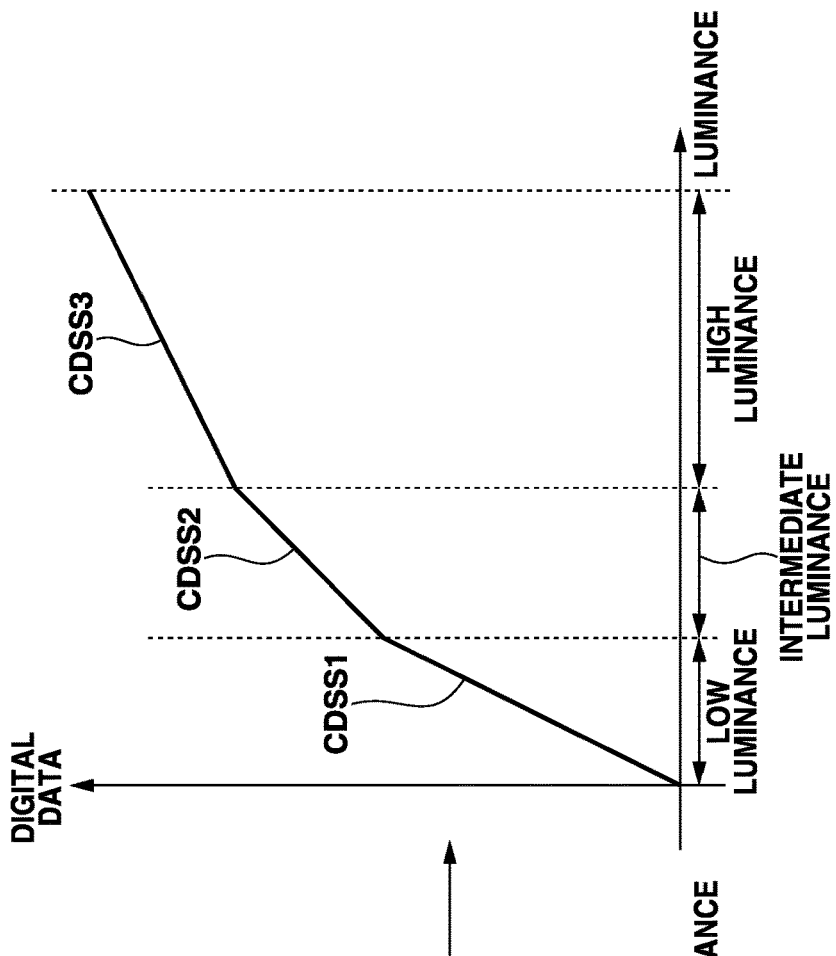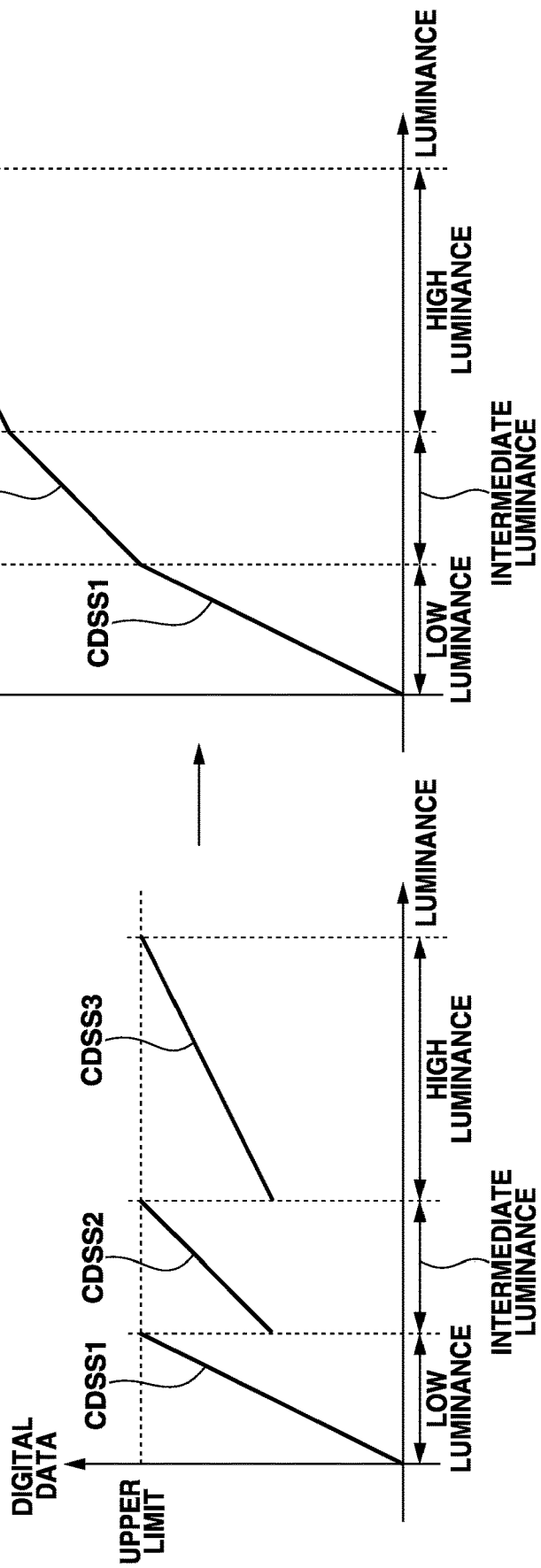

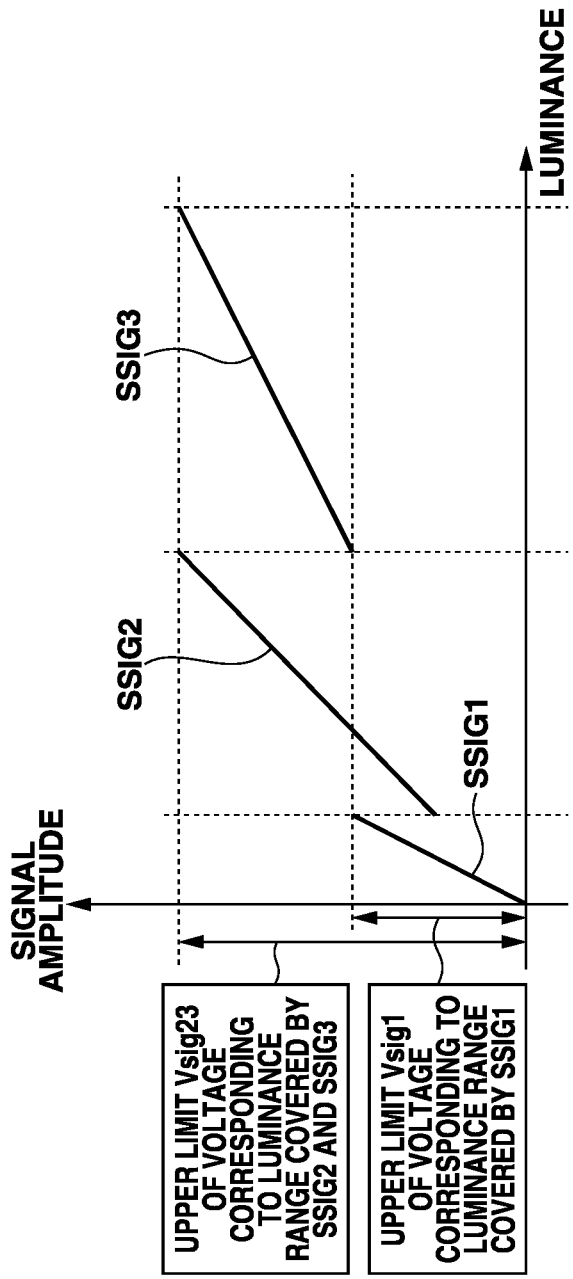

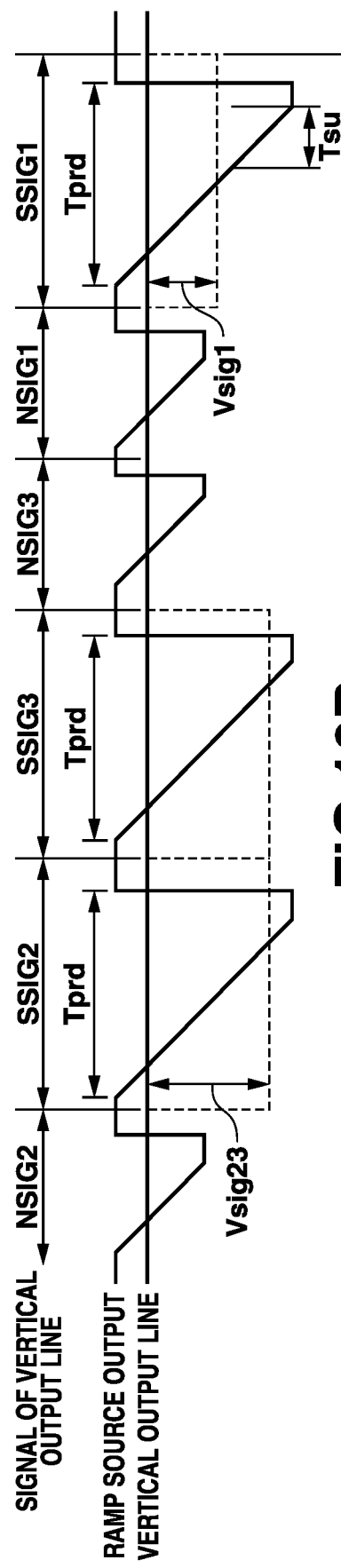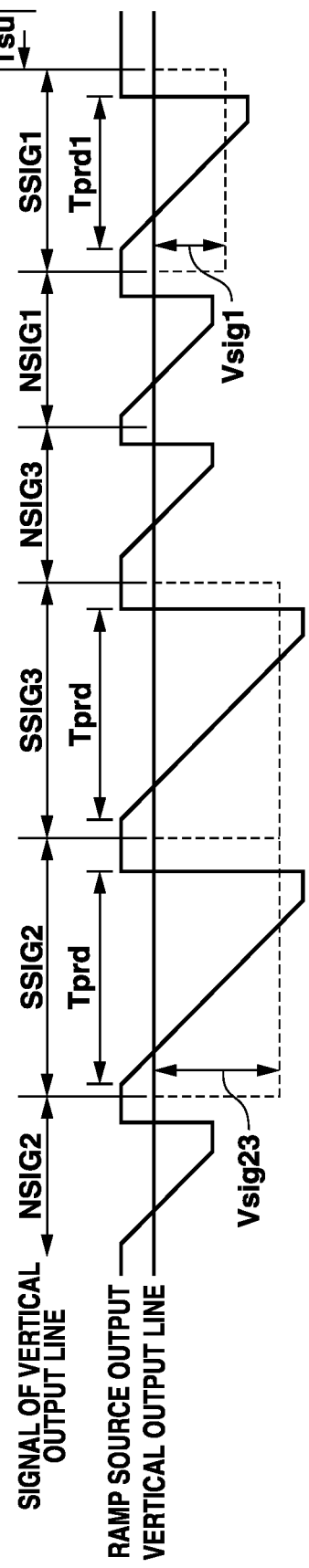

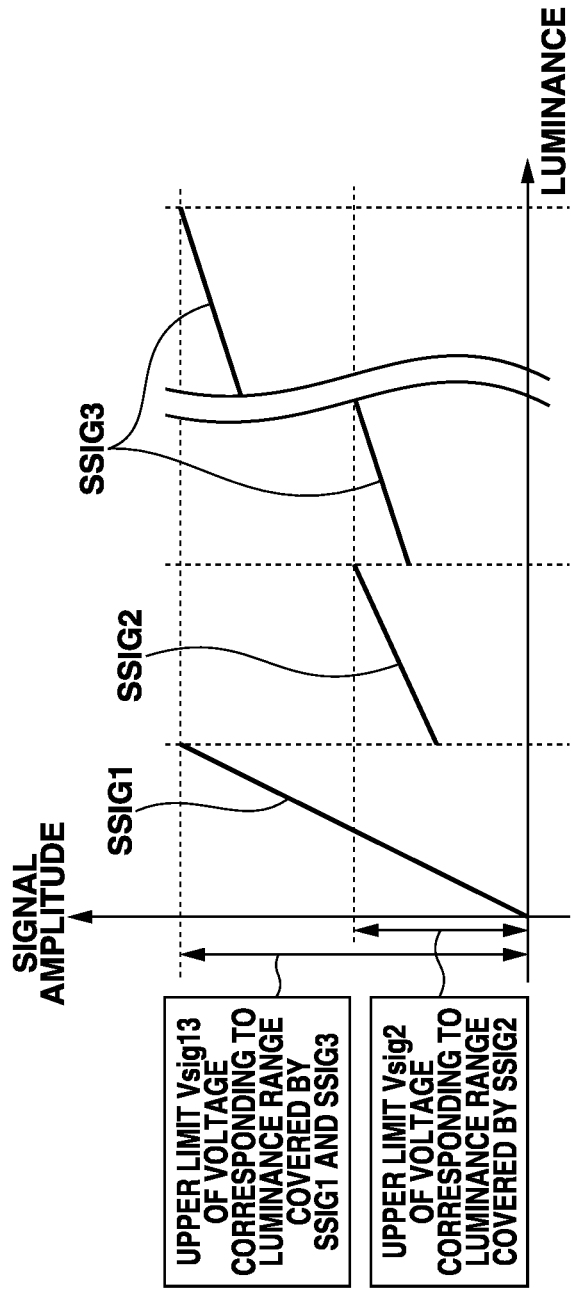

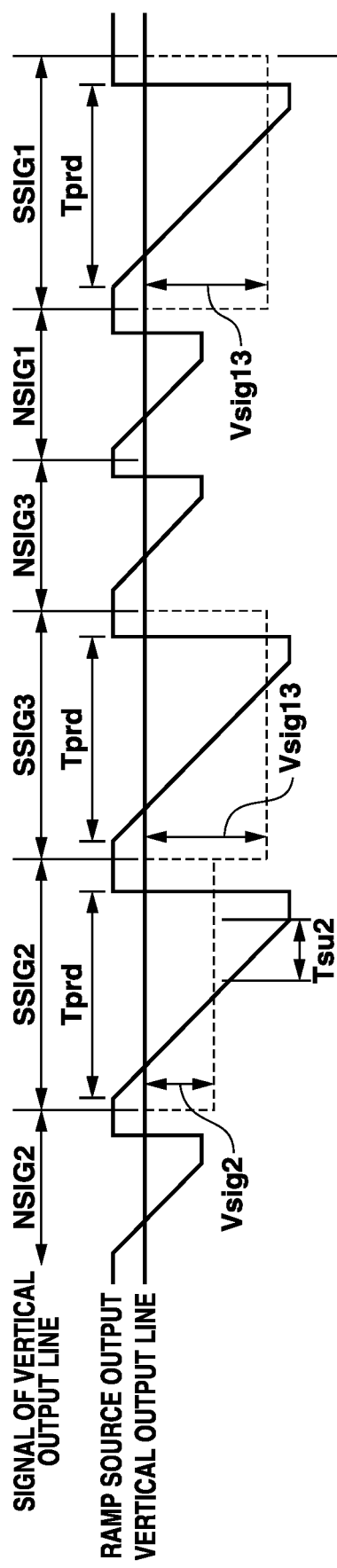
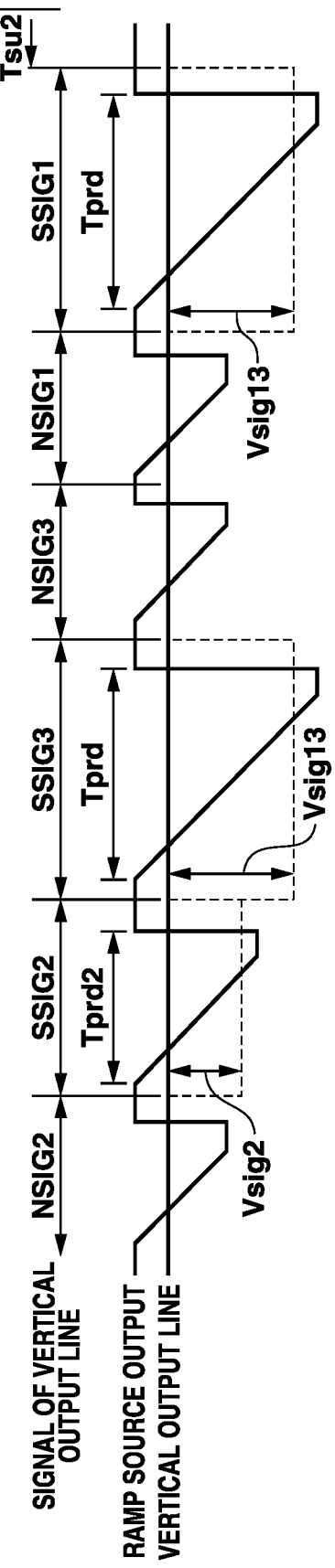

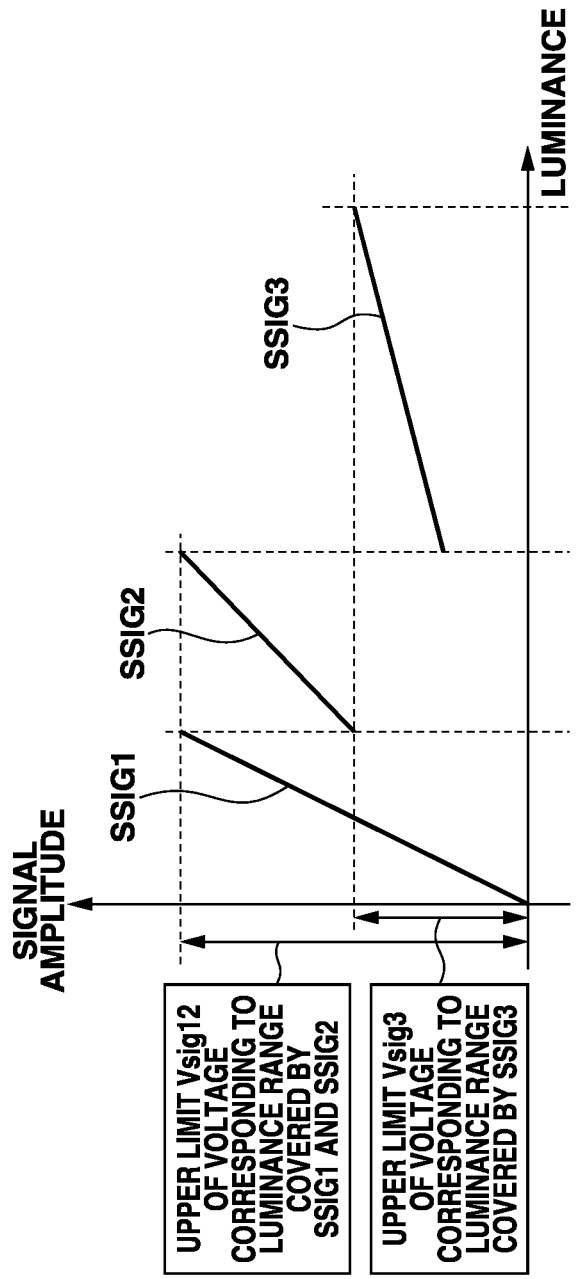

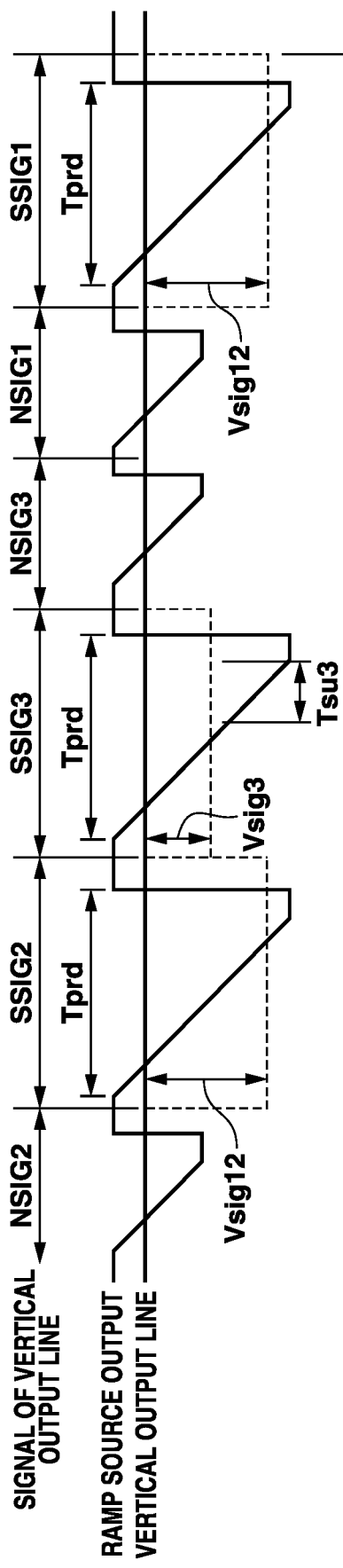
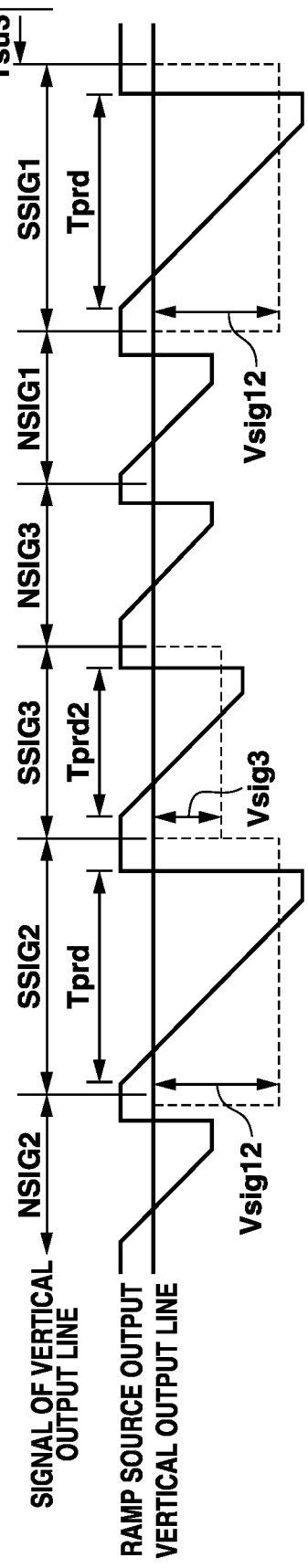

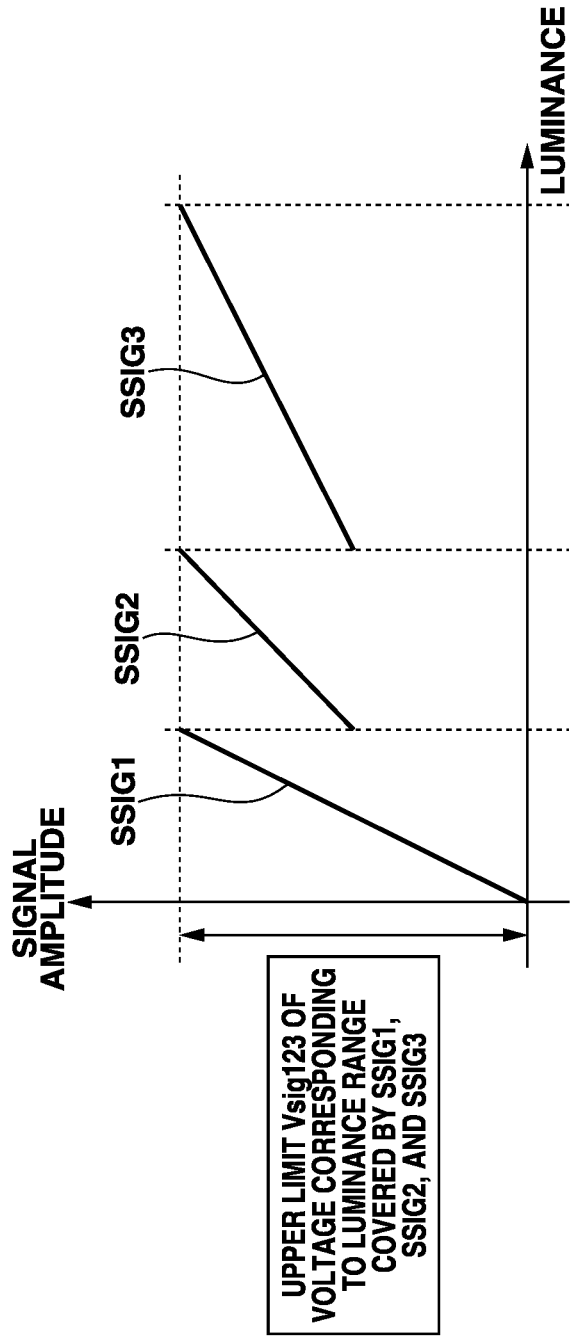

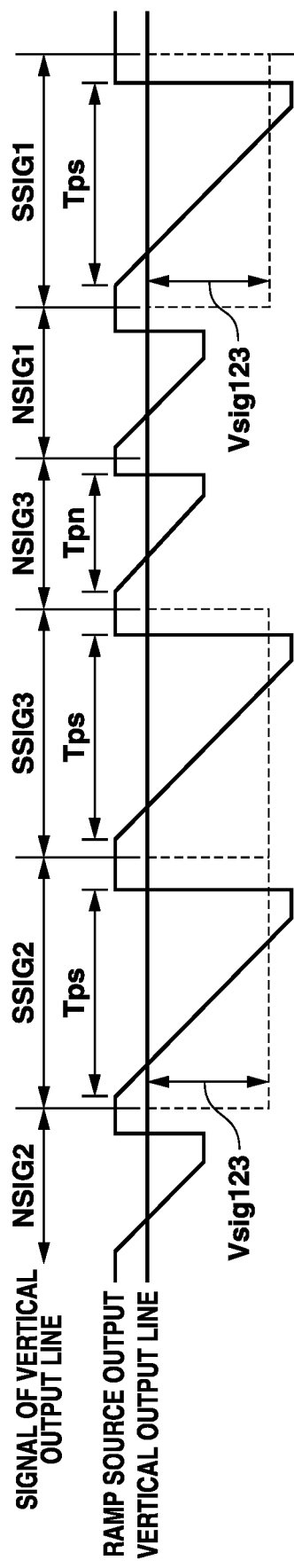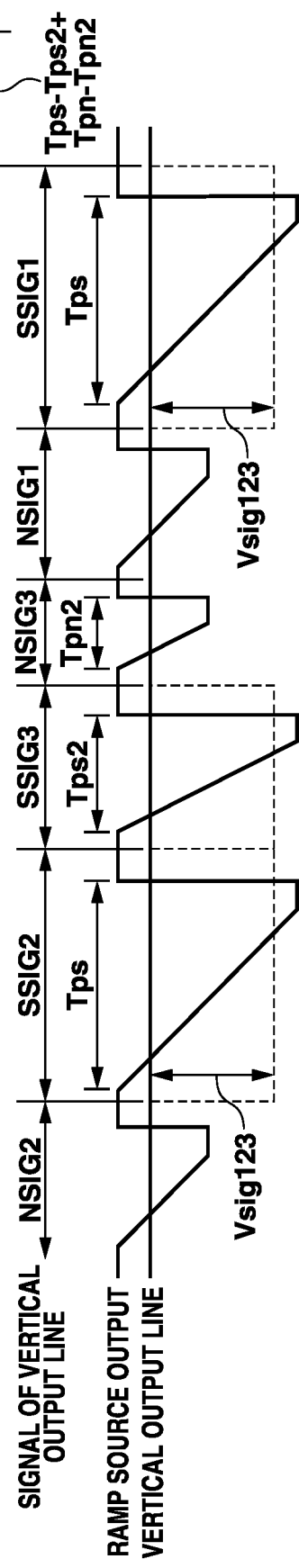

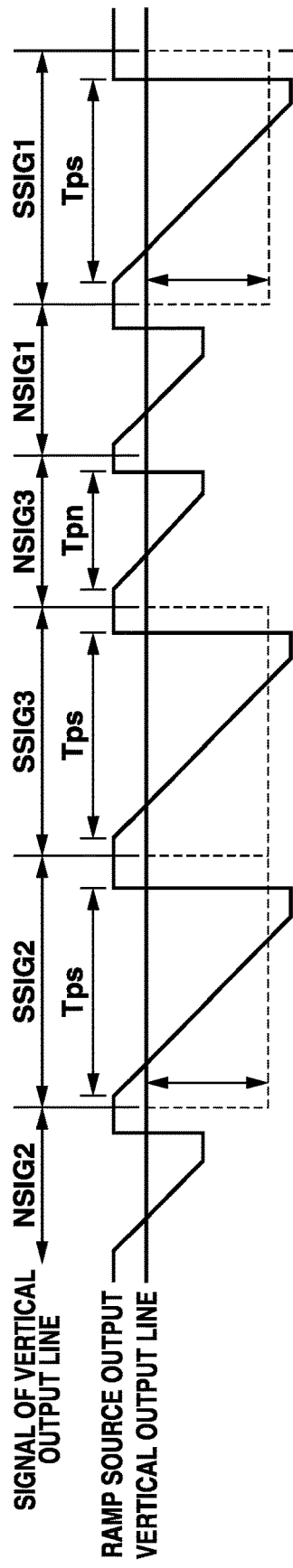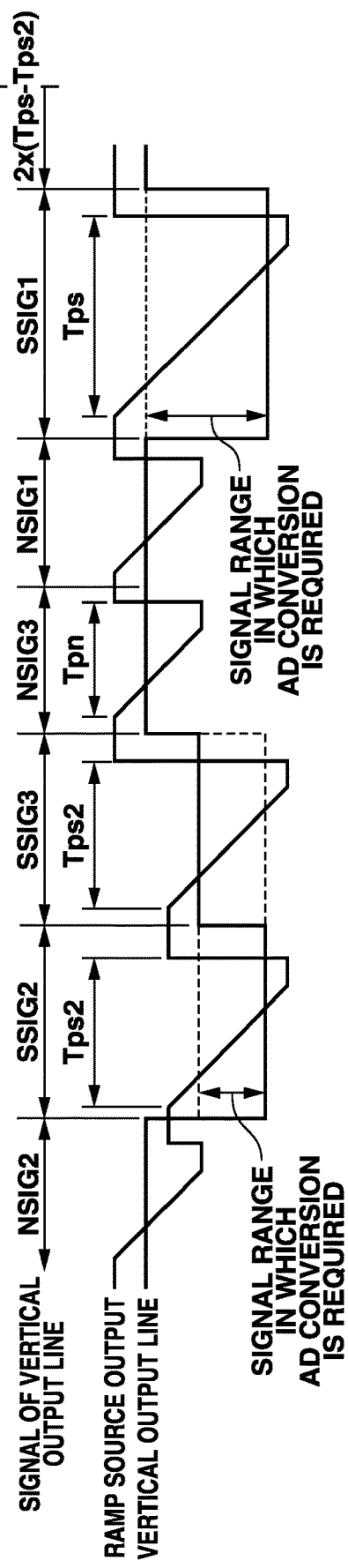

FIG.23A
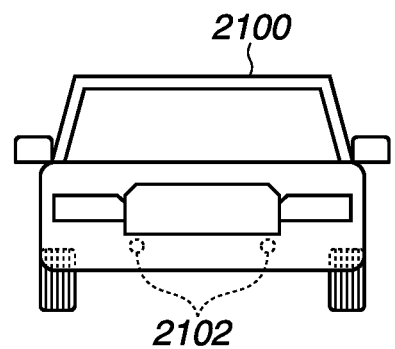
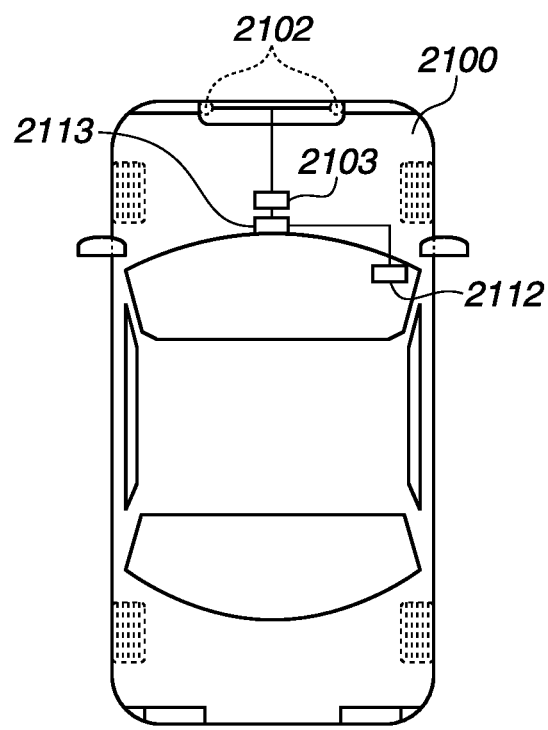
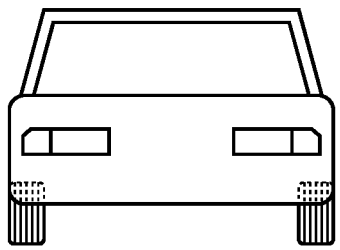

PHOTOELECTRIC CONVERSION APPARATUS HAVING ANALOG-TO-DIGITAL CONVERSION BASED ON SIGNAL CHARGE, IMAGE CAPTURING SYSTEM, AND MOVING BODY

CROSS-REFERENCE TO RELATED APPLICATION

This application is a Divisional of U.S. application Ser. No. 17/180,563, filed Feb. 19, 2021, which claims priority from Japanese Patent Application No. 2020-033819, filed Feb. 28, 2020, which is hereby incorporated by reference herein in its entirety.

BACKGROUND

Technical Field

One disclosed aspect of the embodiments relates to a photoelectric conversion apparatus, an image capturing system, and a moving body.

Description of the Related Art

In recent years, there is demand for a photoelectric conversion apparatus with a wide dynamic range. As a technique for increasing a dynamic range, an image capturing apparatus including pixels each having a configuration in which a photodiode having a large light-receiving surface area, a photodiode having a small light-receiving surface area, and an overflow capacitance are disposed is discussed by Manuel Innocent, et al. "Pixel with nested photo diodes and 120 dB single exposure dynamic range" IISW Dig. Tech. Papers, pp. 13, June 2019. The image capturing apparatus discussed in "Pixel with nested photo diodes and 120 dB single exposure dynamic range" reads out three signals to thereby increase the dynamic range. First, the image capturing apparatus reads out a signal obtained by converting an electric charge photoelectrically converted by the photodiode having the large light-receiving surface area into a voltage with a floating diffusion (hereinafter referred to as "FD") capacitance, and also reads out a signal obtained by converting an electric charge photoelectrically converted by the photodiode having the small light-receiving surface area into a voltage with the FD capacitance. Further, the image capturing apparatus reads out a signal obtained by converting an electric charge, which has been photoelectrically converted by the photodiode having the small light-receiving surface area and has overflown, into a voltage with a combined capacitance of the FD capacitance and the overflow capacitance.

In the image capturing apparatus discussed in "Pixel with nested photo diodes and 120 dB single exposure dynamic range", the signal from the photodiode having the large light-receiving surface area, the signal from the photodiode having the small light-receiving surface area, and the signal accumulated in the overflow capacitance are sequentially read out. However, the document fails to disclose a technique for performing an analog-to-digital conversion (hereinafter "AD conversion") on the three signals, and fails to disclose or suggest how to perform the AD conversion.

These signals cover different signal ranges and different luminance ranges. The range of signal values each signal can take is determined depending on the circuit configuration or element configuration of the image capturing apparatus, and the range is typically common. However, which part of the range of signal values each signal can take is actually used for image data varies depending on the setting of the luminance range covered by each signal. For example, for one signal among the three signals, only a part of the range of signal values the signal can take may be used for image data. Accordingly, if the same AD conversion is performed on the three signals, a redundant operation may occur depending on the signal.

An exemplary embodiment of the disclosure has been made in view of the above-described circumstances, and is directed to improving an AD conversion performance.

SUMMARY

As mentioned above, a redundant operation may occur in the AD conversion. By omitting a redundant operation or replacing the operation with another operation, for example, the AD conversion period can be shortened and the resolution for AD conversion can be optimized, which leads to an improvement in AD conversion performance. According to an aspect of the embodiments, a photoelectric conversion apparatus includes a pixel and an analog-to-digital conversion circuit. The pixel includes a first photoelectric conversion portion, a second photoelectric conversion portion, and an accumulation portion configured to accumulate a signal charge in a location other than the first photoelectric conversion portion and the second photoelectric conversion portion. The analog-to-digital conversion circuit is configured to perform an analog-to-digital conversion on a signal based on a signal charge generated in the first photoelectric conversion portion and on a signal based on a signal charge generated in the second photoelectric conversion portion. The photoelectric conversion apparatus reads out: (1) a first signal based on a first signal charge accumulated in the first photoelectric conversion portion during an electric charge accumulation period, (2) a second signal based on a second signal charge accumulated in the second photoelectric conversion portion during the electric charge accumulation period, and (3) a third signal based on a third signal charge. The third signal charge is generated in the second photoelectric conversion portion and accumulated in the accumulation portion during the electric charge accumulation period. The conversion periods for analog-to-digital conversion to be performed on at least two of the first, second, or third signals have different lengths.

According to another aspect of the embodiments, a photoelectric conversion apparatus includes a pixel and an analog-to-digital conversion circuit. The pixel includes a first photoelectric conversion portion, a second photoelectric conversion portion, and an accumulation portion configured to accumulate a signal charge in a location other than the first photoelectric conversion portion and the second photoelectric conversion portion. The analog-to-digital conversion circuit is configured to perform an analog-to-digital conversion on a signal based on a signal charge generated in the first photoelectric conversion portion and on a signal based on a signal charge generated in the second photoelectric conversion portion. The photoelectric conversion apparatus reads out: (1) a first signal based on a first signal charge accumulated in the first photoelectric conversion portion during an electric charge accumulation period, (2) a second signal based on a second signal charge accumulated in the second photoelectric conversion portion during the electric charge accumulation period, and (3) a third signal based on a third signal charge. The third signal charge is generated in the second photoelectric conversion portion and accumulated in the accumulation portion during the electric charge accumulation period. The conversion resolutions for analog-to-digital conversion to be performed on at least two of the first, second, or third signals are different.

According to still another aspect of the embodiments, a photoelectric conversion apparatus includes a pixel and an analog-to-digital conversion circuit. The pixel includes a photoelectric conversion portion, a capacitor element, and an output portion. The output portion includes an input node to receive a signal charge generated in the photoelectric conversion portion and is configured to output a signal based on the signal charge. The analog-to-digital conversion circuit is configured to perform an analog-to-digital conversion on the signal. The capacitor element is electrically connected to the input node via a transistor and forms a part of a capacitance of the input node. The conversion periods for analog-to-digital conversion to be performed on a first signal output from the output portion in a case where the capacitor element and the input node are electrically connected and on a second signal output from the output portion in a case where the capacitor element and the input node are not electrically connected have different lengths.

According to still one more aspect of the embodiments, a photoelectric conversion apparatus includes a pixel and an analog-to-digital conversion circuit. The pixel includes a photoelectric conversion portion, a capacitor element, and an output portion. The output portion includes an input node to receive a signal charge generated in the photoelectric conversion portion and is configured to output a signal based on the signal charge. The analog-to-digital conversion circuit is configured to perform an analog-to-digital conversion on the signal. The capacitor element is electrically connected to the input node via a transistor and forms a part of a capacitance of the input node. The conversion resolutions for analog-to-digital conversion to be performed on a first signal output from the output portion in a case where the capacitor element and the input node are electrically connected and on a second signal output from the output portion in a case where the capacitor element and the input node are not electrically connected are different.

According to still one more aspect of the embodiments, a photoelectric conversion apparatus includes a pixel, an accumulation portion, and an analog-to-digital conversion circuit. The pixel includes a photoelectric conversion portion. The accumulation portion is configured to accumulate a signal charge generated in the photoelectric conversion portion in a location other than the photoelectric conversion portion. The analog-to-digital conversion circuit is configured to perform an analog-to-digital conversion on a signal based on the signal charge generated in the photoelectric conversion portion. The photoelectric conversion apparatus reads out a first signal based on a first signal charge accumulated in the photoelectric conversion portion during an electric charge accumulation period and a second signal based on a second signal charge accumulated in the accumulation portion during the electric charge accumulation period. The conversion periods for analog-to-digital conversion to be performed on the first and second signals have different lengths.

According to still one more aspect of the embodiments, a photoelectric conversion apparatus includes a pixel, an accumulation portion, and an analog-to-digital conversion circuit. The pixel includes a photoelectric conversion portion. The accumulation portion is configured to accumulate a signal charge generated in the photoelectric conversion portion in a location other than the photoelectric conversion portion. The analog-to-digital conversion circuit is configured to perform an analog-to-digital conversion on a signal based on the signal charge generated in the photoelectric conversion portion. The photoelectric conversion apparatus reads out a first signal based on a first signal charge accumulated in the photoelectric conversion portion during an electric charge accumulation period and a second signal based on a second signal charge accumulated in the accumulation portion during the electric charge accumulation period. The conversion resolutions for analog-to-digital conversion to be performed on the first and second signals are different.

According to still one more aspect of the embodiments, a photoelectric conversion apparatus includes a pixel and an analog-to-digital conversion circuit. The pixel includes a photoelectric conversion portion. The analog-to-digital conversion circuit is configured to perform an analog-to-digital conversion on a signal based on a signal charge generated in the photoelectric conversion portion. The analog-to-digital conversion circuit includes a comparator configured to compare the signal with a reference signal used for analog-to-digital conversion. A first potential range that can be covered by the reference signal is narrower than a second potential range that can be covered by the signal to be compared with the reference signal.

Further features of the disclosure will become apparent from the following description of exemplary embodiments with reference to the attached drawings.

BRIEF DESCRIPTION OF THE DRAWINGS

FIG. 5 is a timing diagram illustrating an analog-to-digital (AD) conversion method for the photoelectric conversion apparatus according to the exemplary embodiment.

FIG. 6A is a circuit diagram illustrating a configuration example of a ramp source in the photoelectric conversion apparatus according to the exemplary embodiment.

FIG. 6B is a timing diagram illustrating an operation of the ramp source in the photoelectric conversion apparatus according to the exemplary embodiment.

FIGS. 8A and 8B are graphs each illustrating a relationship between the luminance of each signal and digital data in the photoelectric conversion apparatus according to the exemplary embodiment.

FIG. 9 is a graph illustrating a relationship between the luminance and the signal amplitude of each signal in the photoelectric conversion apparatus according to the exemplary embodiment.

FIGS. 10A and 10B are timing diagrams each illustrating an operation of an AD conversion portion in the photoelectric conversion apparatus according to the exemplary embodiment.

FIG. 11 is a graph illustrating a relationship between the luminance and the signal amplitude of each signal in the photoelectric conversion apparatus according to the exemplary embodiment.

FIGS. 12A and 12B are timing diagram each illustrating an operation of the AD conversion portion in the photoelectric conversion apparatus according to the exemplary embodiment.

FIG. 13 is a graph illustrating a relationship between the luminance and the signal amplitude of each signal in the photoelectric conversion apparatus according to the exemplary embodiment.

FIGS. 14A and 14B are timing diagrams each illustrating an operation of the AD conversion portion in the photoelectric conversion apparatus according to the exemplary embodiment.

FIG. 15 is a graph illustrating a relationship between the luminance and the signal amplitude of each signal in the photoelectric conversion apparatus according to the exemplary embodiment.

FIGS. 16A and 16B are timing diagrams each illustrating an operation of the AD conversion portion in the photoelectric conversion apparatus according to the exemplary embodiment.

FIGS. 17A and 17B are timing diagrams each illustrating an operation of the AD conversion portion in the photoelectric conversion apparatus according to the exemplary embodiment.

FIG. 23A schematically illustrates the appearance of a moving body according to an exemplary embodiment.

DESCRIPTION OF THE EMBODIMENTS

Figure 1:
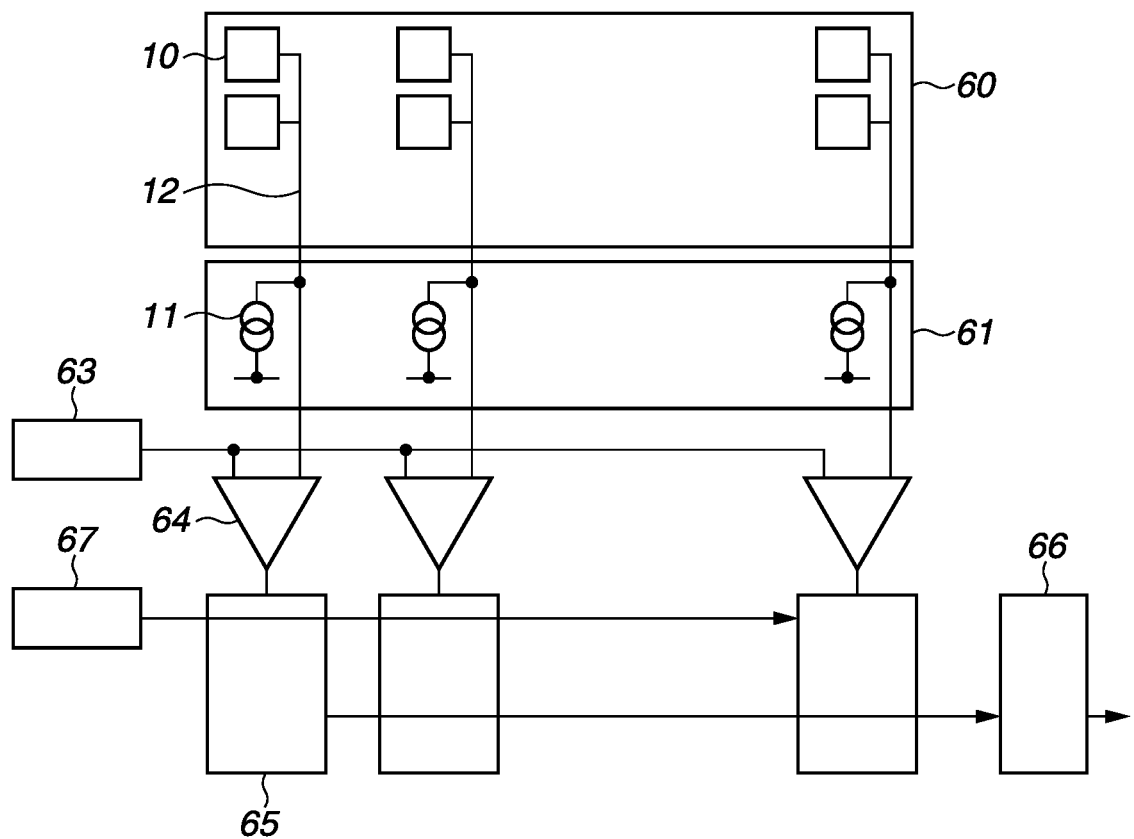
FIG. 1 is a schematic diagram illustrating a photoelectric conversion apparatus according to an exemplary embodiment of the disclosure.

Hereinafter, embodiments will be described in detail with reference to the attached drawings. Note, the following embodiments are not intended to limit the scope of the disclosure. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

An example of a mode for carrying out a first exemplary embodiment will be described with reference to the drawings. FIG. 1 is a schematic diagram illustrating a configuration of a photoelectric conversion apparatus according to the present exemplary embodiment. The photoelectric conversion apparatus according to the present exemplary embodiment is applied to an image capturing apparatus, a ranging sensor, an infrared sensor, a radiation sensor, and other photodetector sensors.

The photoelectric conversion apparatus illustrated in FIG. 1 includes a pixel portion 60 including pixel circuits 10 disposed in a matrix, a current source group 61 including current sources 11, comparison circuits 64 disposed in each column, a ramp source 63, column memories 65 disposed in each column, a counter circuit 67, and an operation processing unit 66.

Each pixel circuit 10 converts incident light into a signal, and outputs the signal based on the incident light. Each current source 11 supplies a source follower transistor to be described below with a current. Each current source 11 and the source follower transistor form a source follower circuit. The source follower circuit is used as an output circuit to output the signal read out from the corresponding pixel circuit 10 to a vertical output line 12.

Each comparison circuit 64, the ramp source 63, and the counter circuit 67 are examples of an analog-to-digital conversion portion or circuit for performing an analog-to-digital conversion (hereinafter referred to as AD conversion) on the signal output from each pixel circuit 10. Two input terminals of each comparison circuit 64 are connected to the vertical output line 12 and an output terminal of the ramp source 63, respectively. The ramp source 63 is an example of a reference signal source that outputs a reference signal, such as a ramp signal, which is used for AD conversion. Each comparison circuit 64 is a comparator that compares a potential of the vertical output line 12 with a potential of the ramp source 63. When a magnitude relation between the potentials is inverted, an output potential of the comparison circuit 64 is inverted from a high level to a low level, or from the low level to the high level. An output terminal of each comparison circuit 64 is connected to the corresponding column memory 65. Further, each column memory 65 receives a signal output from the counter circuit 67. When the output potential of each comparison circuit 64 is inverted, the corresponding column memory 65 stores a count value output from the counter circuit 67 as digital data. The digital data stored in the column memory 65 after the AD conversion is performed is digital data converted from the signal output from the corresponding pixel circuit 10.

The digital data stored in each column memory 65 is transferred to the operation processing unit 66, and the operation processing unit 66 performs operation processing, such as correlated double sampling (CDS) processing or offset correction described above, on the digital data, and outputs the data subjected to the operation processing to the outside of the photoelectric conversion apparatus.

In FIG. 1, the illustration of a transmitter for outputting data to the outside of the photoelectric conversion apparatus and other circuits is omitted.

Figure 2:
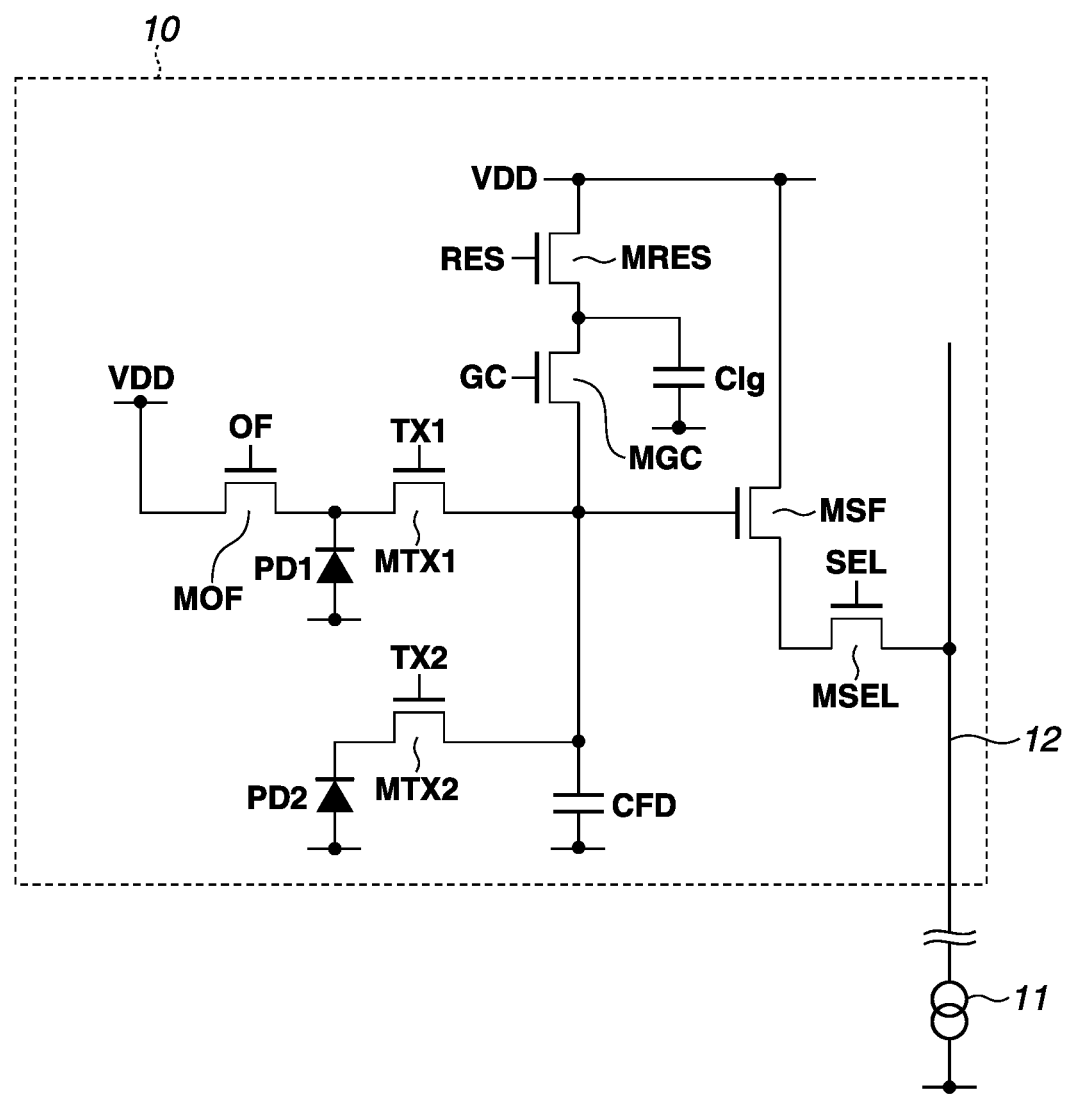
FIG. 2 is a circuit diagram illustrating a configuration example of a pixel circuit in the photoelectric conversion apparatus according to the exemplary embodiment.

FIG. 2 is an equivalent circuit diagram of the pixel circuit 10 according to the present exemplary embodiment. The pixel circuit 10 illustrated in FIG. 2 will be described. The pixel circuit 10 includes a first photodiode PD1 and a second photodiode PD2. Further, the pixel circuit 10 includes transfer switches MTX1 and MTX2, an overflow switch MOF, and a floating diffusion (FD) capacitance CFD, a gain control switch MGC, a capacitor element Clg, a reset switch MRES, a source follower transistor MSF, and a select switch MSEL.

Functions of each element and connections between the elements will be described. The first photodiode PD1 and the second photodiode PD2 are examples of a photoelectric conversion portion or circuit. When light is incident on each of the first photodiode PD1 and the second photodiode PD2, an electric charge is generated by photoelectric conversion. Each of the first photodiode PD1 and the second photodiode PD2 accumulates the generated electric charge as a signal charge.

The source of the transfer switch MTX1 and the cathode of the first photodiode PD1 are electrically connected, and the drain of the transfer switch MTX1 and the input node (gate) of the source follower transistor MSF are electrically connected. The source of the transfer switch MTX2 and the cathode of the second photodiode PD2 are electrically connected, and the drain of the transfer switch MTX2 and the input node of the source follower transistor MSF are electrically connected.

The gates of the transfer switches MTX1 and MTX2 receive control signals TX1 and TX2, respectively. When each control signal is at the high level, the signal charge is transferred from each photodiode to the input node of the source follower transistor MSF.

The drain of the overflow switch MOF is connected to a power supply VDD. The source of the overflow switch MOF is connected to the cathode of the first photodiode PD1. The gate of the overflow switch MOF receives a control signal OF. In the overflow switch MOF, a potential barrier corresponding to a gate potential is formed. When the control signal OF is at the high level, the signal charge is transferred from the first photodiode PD1 to the power supply VDD. When the control signal OF has an intermediate potential LM1 (Low<LM1<High), the potential barrier between the power supply VDD and the first photodiode PD1 is set to a level lower than the barrier in other regions, thereby making it possible to discharge an excess electric charge to the power supply VDD.

The drain of the transfer switch MTX1, the drain of the transfer switch MTX2, the source of the gain control switch MGC, and the gate of the source follower transistor MSF are connected together and form one node. The one node is also referred to as an FD node or an FD portion. In FIG. 2, the capacitance of the FD portion is represented by the FD capacitance CFD. The FD capacitance CFD may include a parasitic capacitance component of a line forming the FD portion and a parasitic capacitance component of the gate of a transistor connected to the FD portion. The FD capacitance CFD may also include a PN junction capacitance component of a semiconductor region that forms the FD portion, and a PN junction capacitance component of the source or drain of a transistor connected to the FD portion. The FD capacitance CFD may include not only these capacitance components, but also capacitor elements, such as a PIP capacitance, a MIM capacitance, and a MOS capacitance. In a case where these capacitor elements are disposed, one end of each of the capacitor elements is connected to the drain of the transfer switch MTX1, the drain of the transfer switch MTX2, the source of the gain control switch MGC, and the gate of the source follower transistor MSF.

The drain of the gain control switch MGC is connected to one of the terminals of the capacitor element Clg and the source of the reset switch MRES. The gate of the gain control switch MGC receives a control signal GC. In a state where an electric charge is accumulated in the capacitor element Clg, the control signal GC is set to the low level and the gain control switch MGC is turned off, thereby separating the capacitor element Clg from the capacitance CFD. Further, the control signal GC is switched to the high level or the low level and the gain control switch MGC is turned on or off, thereby making it possible to switch whether to handle the capacitor element Clg as a part of the FD capacitance. Thus, the gain for charge voltage conversion can be changed. Further, when the control signal GC is at the intermediate potential LM1 (Low<LM1<High), the potential barrier between the capacitor element Clg and the second photodiode PD2 is set to a level lower than the barrier in other regions, thereby making it possible to discharge an excess electric charge to the capacitor element Clg.

The power supply VDD is connected to each of the drain of the reset switch MRES and the drain of the source follower transistor MSF. The gate of the reset switch MRES receives a control signal RES. When the control signal RES is at the high level, the reset switch MRES is turned on. When the reset switch MRES is turned on, some or all of the first photodiode PD1, the second photodiode PD2, the FD portion, and the capacitor element Clg can be reset.

The source of the source follower transistor MSF is connected to the vertical output line 12 via the select switch MSEL. The gate of the select switch MSEL receives a control signal SEL. When the control signal SEL is at the high level, the select switch MSEL is turned on and the source follower transistor MSF and the current source 11 form the source follower circuit.

Assume herein that the anode of the first photodiode PD1 and the anode of the second photodiode PD2 are each connected to a ground potential, and that the other of the terminals of each of the capacitance CFD and the capacitor element Clg is connected to the ground potential.

The second photodiode PD2 includes a low-potential region formed of electrons serving as signal charges, and the potential barrier corresponding to the signal charges is formed around the region. In other words, a region in which the potential is locally high is present in the cathode of the second photodiode PD2. Accordingly, generated signal charges are accumulated in the cathode of the second photodiode PD2. As the electrons serving as signal charges are accumulated, the potential at the cathode of the second photodiode PD2 decreases. As a result, the level of the potential barrier formed around the second photodiode PD2 decreases.

The amount of electric charge generated by photoelectric conversion may exceed the amount of electric charge that can be accumulated in the photodiode, so that an excess electric charge may be generated. If a large amount of light is incident on the second photodiode PD2 and an excess electric charge is generated, the excess electric charge overflows from a lowest portion of the potential barrier.

The transfer switch MTX2 is present between the second photodiode PD2 and the FD portion, and the gain control switch MGC is present between the FD portion and the capacitor element Clg. The level of the potential barrier in a region immediately below the gate of the transfer switch MTX2, i.e., in a channel region of the transfer switch MTX2 can be controlled by the control signal TX2 from the transfer switch MTX2. Similarly, the level of the potential barrier in a region immediately below the gate of the gain control switch MGC, i.e., in a channel region of the gain control switch MGC can be controlled by the control signal GC from the gain control switch MGC.

The control signal TX2 from the transfer switch MTX2 is controlled so that the potential barrier between the photodiode PD2 and the FD portion is set to a lowest level in the potential barrier surrounding the photodiode PD2. In this case, an excess electric charge generated in the second photodiode PD2 is discharged through the transfer switch MTX2. When the gain control switch MGC is turned off, the discharged excess electric charge is held in the FD portion.

Turning on/off of the gain control switch MGC is controlled by the control signal GC input to the gain control switch MGC. When the gain control switch MGC is turned on, the discharged excess electric charge is held in the FD portion and the capacitor element Clg.

Figure 3:
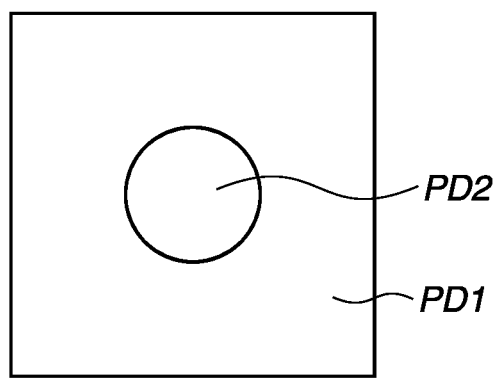
FIG. 3 schematically illustrates a planar structure of the photoelectric conversion apparatus according to the exemplary embodiment.

An example of the arrangement of the first and second photodiodes PD1 and PD2 in the pixel circuit 10 illustrated in FIG. 2 will be described with reference to FIG. 3. FIG. 3 schematically illustrates a planar structure of the photoelectric conversion apparatus according to the present exemplary embodiment. Specifically, FIG. 3 illustrates an example of the arrangement of the first and second photodiodes PD1 and PD2 on a light-receiving surface of the photoelectric conversion apparatus.

In the present exemplary embodiment, the light-receiving surface of the second photodiode PD2 is disposed in a circular shape at the center of a pixel, and the light-receiving surface of the first photodiode PD1 is disposed in a region surrounding the light-receiving surface of the second photodiode PD2. As illustrated in FIG. 3, the area of the light-receiving surface of the first photodiode PD1 is larger than the area of the light-receiving surface of the second photodiode PD2. Accordingly, when light with a uniform intensity is incident on the entire light-receiving surface, that is, when the same amount of incident light per unit area is incident on the entire light-receiving surface, the amount of electric charge generated in the first photodiode PD1 is greater than the amount of electric charge generated in the second photodiode PD1. In other words, the sensitivity to light of the first photodiode PD1 is higher than the sensitivity to light of the second photodiode PD2.

The shapes and arrangement of the first and second photodiodes PD1 and PD2 are not limited to those in the example illustrated in FIG. 3. For example, the second photodiode PD2 may have a rectangular shape or any other shape. One of the photodiodes (first photodiode PD1) need not surround the other photodiode (second photodiode PD2).

In the present exemplary embodiment, the area of the light-receiving surface of the first photodiode PD1 is different from the area of the light-receiving surface of the second photodiode PD2. However, the area of the light-receiving surface of the first photodiode PD1 may be equal to the area of the light-receiving surface of the second photodiode PD2. In this case, the sensitivity of the first photodiode PD1 is equal to the sensitivity of the second photodiode PD2. An advantageous effect of increasing the dynamic range can be obtained by using two photodiodes with different sensitivities. However, the advantageous effect of increasing the dynamic range by using two photodiodes with different sensitivities need not necessarily obtained in the present exemplary embodiment. The configuration for providing two photodiodes (PD1 and PD2) with different sensitivities can be changed. For example, filters having different light transmittances may be disposed on the first photodiode PD1 and the second photodiode PD2, respectively. Alternatively, the area of the light-receiving surface of each photodiode may be set depending on the area of an opening of a light-shielding film.

In a case where microlenses for guiding incident light onto the photoelectric conversion portion are provided, each microlens is disposed to cover the two photodiodes PD1 and PD2. Accordingly, when a single microlens is projected on the light-receiving surface, the projection of the microlens partially overlaps the light-receiving surface of each of the photodiodes PD1 and PD2.

Figure 4:
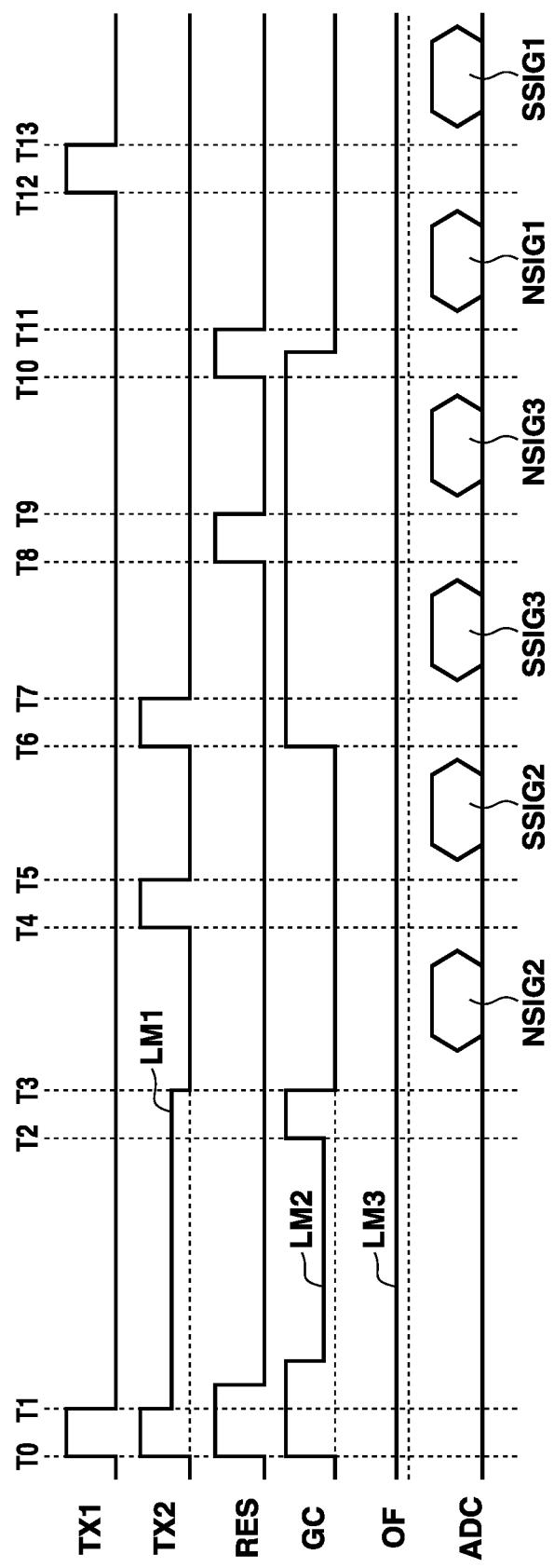
FIG. 4 is a timing diagram illustrating an operation of the pixel circuit in the photoelectric conversion apparatus according to the exemplary embodiment.

FIG. 4 is a timing diagram illustrating an operation according to the present exemplary embodiment. The operation of the pixel circuit 10 illustrated in FIG. 2 will be described with reference to FIG. 4. FIG. 4 illustrates the control signal TX1, the control signal TX2, the control signal RES, the control signal GC, and the control signal OF. In FIG. 4, "ADC" schematically represents a period in which the AD conversion is performed on the signal read from the pixel circuit 10.

Assume herein that a period after time T2 is referred to as a read-out period in which a signal is read from the pixel circuit. Although not illustrated in FIG. 4, in a row corresponding to a row in which a signal is read out, the control signal SEL is at the high level and the select switch MSEL is turned on in the read-out period.

Six signals, i.e., signals SSIG1, SSIG2, and SSIG3 and reset signals NSIG1, NSIG2, and NSIG3, are read out from the pixel circuit 10 during the operation of reading out the signals in one row. The AD conversion is performed on the above-described six signals during each period indicated by the symbol corresponding to "ADC" in FIG. 4.

The signal SSIG1 is a signal based on an electric charge Q1 accumulated in the first photodiode PD1. The signal SSIG2 is a signal based on an electric charge Q2 accumulated in the second photodiode PD2. The signal SSIG3 is a signal based on the electric charge Q2 accumulated in the second photodiode PD2 and electric charges (QCFD and QClg) which have overflown from the second photodiode PD2 during the accumulation period. The reset signals NSIG1, NSIG2, and NSIG3 are signals representing noise levels (N1, N2, and N3) in reset states corresponding to the signals SSIG1, SSIG2, and SSIG3, respectively.

In the example illustrated in FIG. 4, the signals are read out in the order of the reset signal NSIG2, the signal SSIG2, the signal SSIG3, the reset signal NSIG3, the reset signal NSIG1, and the signal SSIG1. Reading the signals in this order makes it possible to perform CDS on the signal SSIG1 and SSIG2 on the low-luminance side, which leads to a reduction in noise. However, the present exemplary embodiment is not limited to the order of reading out the signals.

In FIG. 4, the control signals TX2, GC, and OF may be set to intermediate potentials LM1, LM2, and LM3 (Low<LM<High), respectively. The reason for setting the control signals TX2, GC, and OF to the intermediate potentials LM1, LM2, and LM3, respectively, is that excess electric charges generated in the photodiodes PD1 and PD2 are controlled in a case where a large amount of light is incident on the photodiodes PD1 and PD2. This control operation makes it possible to reduce or prevent adverse effects of part of excess electric charges on peripheral pixels and elements.

When light is incident on the photodiodes PD1 and PD2, the cathode potential of each of the photodiodes PD1 and PD2 decreases depending on the amount of incident light. In the case of the first photodiode PD1, when a potential difference (Vgs) of the gate potential LM3 of the overflow switch MOF from the cathode potential exceeds a threshold of the overflow switch MOF, the overflow switch MOF is turned on. After the overflow switch MOF is turned on, the electric charge generated in the first photodiode PD1 flows to the power supply VDD. Accordingly, the cathode potential of the first photodiode PD1 is not further decreased. In other words, the amount of the electric charge accumulated in the first photodiode PD1 is limited by the gate potential LM3 of the overflow switch MOF.

The state of the potential for causing the electric charge generated in the first photodiode PD1 to flow to the power supply VDD via the overflow switch MOF will be described. First, the first photodiode PD1 in the reset state includes a low-potential region for electrons serving as signal charges, and the potential barrier corresponding to the signal charges is formed around the region. Specifically, a region in which the potential is locally high is present in the cathode of the first photodiode PD1. Accordingly, the generated signal charges are accumulated in the cathode of the first photodiode PD1. As the electrons serving as signal charges are accumulated, the cathode potential of the first photodiode PD1 decreases. As a result, the level of the potential barrier formed around the first photodiode PD1 decreases. Further, when a large amount of light is incident on the first photodiode PD1 and an excess electric charge is generated, the excess electric charge overflows from a lowest portion of the potential barrier.

The gate potential LM3 of the overflow switch MOF can control the region immediately below the gate of the overflow switch MOF, i.e., the level of the potential barrier in the channel region of the overflow switch MOF. Similarly, the control signal TX1 of the first transfer switch MTX1 can control the region immediately below the gate of the first transfer switch MTX1, i.e., the level of the potential barrier in the channel region of the first transfer switch MTX1. Accordingly, in the present exemplary embodiment, the gate potential LM3 of the overflow switch MOF is set to be higher than the potential of the control signal TX1 during an electric charge accumulation period. As a result, the potential barrier in the region between the first photodiode PD1 and the power supply VDD (channel region of the overflow switch MOF) is lower than the potential barrier that separates the first photodiode PD1 from the other region. Thus, in a case where a large amount of light is incident on the first photodiode PD1 and an excess electric charge is generated, the electric charges can be transferred from the first photodiode PD1 to the power supply VDD via the overflow switch MOF. Consequently, even in a case where a large amount of light is incident on the first photodiode PD1 and an excess electric charge is generated in the first photodiode PD1, the excess electric charge can be discharged to the power supply VDD.

In the case of the second photodiode PD2, when the control signal TX2 and the control signal GC are at the intermediate potential and the excess electric charge that cannot be accumulated in the second photodiode PD2 is generated, the electric charge can be held in the capacitance CFD and the capacitor element Clg. Since only the second transfer switch MTX2 is connected to the second photodiode PD2, the amount of electric charge accumulated in the second photodiode PD2 is limited by the gate potential LM1 of the second transfer switch MTX2.

The gain control switch MGC is provided to form a potential barrier between the capacitance CFD and the capacitor element Clg. In a case where the potential barrier is formed between the capacitance CFD and the capacitor element Clg, the excess electric charge which has overflown from the second photodiode PD2 is first held in the capacitance CFD. After that, if an electric charge overflows from the potential barrier and an excess electric charge is generated, the excess electric charge is held in the capacitor element Clg. Accordingly, if a signal is read out in a state where the control voltage GC is set at the intermediate potential, there would be no difference between the signals NSIG2 and SSIG2 to be described below depending on the amount of electric charge held in the capacitance CFD. In other words, the signal based on the electric charge held in the second photodiode PD2 cannot be accurately read out. For this reason, it may be desirable to turn on the gain control switch MGC once to reduce the amount of electric charge held in the capacitance CFD so that the electric charge held in the capacitance CFD can be distributed to the capacitor element Clg. If the electric charge is accumulated in both the capacitance CFD and the capacitor element Clg, there is no need to provide the potential barrier. Specifically, in a case where an excess electric charge generated in the second photodiode PD2 is held in the capacitance CFD and the capacitor element Clg, the control signal GC may be set to the high level when the control signal TX2 is at the intermediate potential.

By setting the control signals OF, TX2, and GC to the intermediate potential as described above, excess electric charges generated in the photodiodes PD1 and PD2 can be discharged and held in the power supply VDD, the capacitance CFD, and the capacitor element Clg. This leads to a reduction in leakage of electric charges to the peripheral pixels and elements.

A correspondence between the timing diagram illustrated in FIG. 4 and the operation of the pixel circuit 10 will be described. First, a period from time T0 to time T1 is a period in which the photodiodes PD1 and PD2 are reset. At time T0, the control signals TX1, TX2, RES, and GC transition from the low level to the high level, and the switches MTX1, MTX2, MRES, and MGC are turned on. In this case, an electrical path from the power supply VDD to the cathode of the first photodiode PD1 and an electrical path from the power supply VDD to the second photodiode PD2 are formed, and the photodiodes PD1 and PD2 are reset. Also, in this case, the potential of the FD portion is reset to the potential of the power supply VDD.

The period after time T1 corresponds to the electric charge accumulation period. At time T1, the control signal TX1 transitions to the low level and the control signal TX2 transitions to the intermediate potential LM1 (Low<LM1<High). At time T1, the transfer switches MTX1 and MTX2 are turned off and the photodiodes PD1 and PD2 start accumulation of electric charges by photoelectric conversion, and thus the electric charge accumulation period is started.

After time T1, the control signal RES transitions to the low level and the reset switch MRES is turned off. When the reset switch MRES is turned off, the nodes including the capacitance CFD and the capacitor element Clg are electrically floating. In this case, the voltages of the capacitance CFD and the capacitor element Clg correspond to the noise signal N1. The noise signal N1 may include random noise components due to the effect of a variation in the power supply VDD when the reset switch MRES is turned off and the effect of electric charge remaining in the channel region of the reset switch MRES immediately before the reset switch MRES is turned off. Then, the control signal GC transitions to the intermediate potential LM2 (Low<LM2<High). At this time, the gain control switch MGC is turned off. In other words, the intermediate potential LM2 is set to the potential at which the potential barrier is generated between the capacitance CFD and the capacitor element Clg in the reset state. The control signal OF is constantly set at the intermediate potential LM3 (Low<LM3<High).

At time T2, the control signal GC transitions to the high level and the gain control switch MGC is turned on, so that the potential of the capacitance CFD becomes equal to the potential of the capacitor element Clg. In this case, an excess electric charge generated in the second photodiode PD2 is held in each of the capacitance CFD and the capacitor element Clg. After that, at time T3, the control signal GC transitions to the low level and the gain control switch MGC is turned off. In this case, the excess electric charge that is generated in the second photodiode PD2 and held in the capacitance CFD is represented by QCFD. The excess electric charge held in the capacitor element Clg is represented by QClg.

During a period from time T3 to time T4, the reset signal NSIG2 is read out and the AD conversion is performed on the reset signal NSIG2. At time T3, the control signal TX2 transitions from the intermediate potential LM2 to the low level. The amount of transition of the potential at time T4 to be described below is set to be equal to the amount of transition of the potential at time T5, so that the potential of the capacitance CFD can be held at a constant level during the period from time T3 to time T4 in which the reset signal NSIG2 is read out and during the period from time T4 to time T5 in which the signal SSIG2 is read out.

The source follower circuit formed of the source follower transistor MSF and the current source 11 outputs the reset signal NSIG2 to the vertical output line 12. The potential of the FD portion corresponds to the potential (noise signal N1) at which noise generated when the reset switch MRES is turned off after time T1 is superimposed on the potential of the power supply VDD combined with the potential at which a variation in the potential of the electric charge QCFD is superimposed. Accordingly, the reset signal NSIG2 is a signal based on the noise signal N1 and the electric charge QCFD. During this period, the AD conversion is performed on the reset signal NSIG2 output from the vertical output line 12.

At time T4, the control signal TX2 transitions to the high level and the transfer switch MTX2 is turned on, so that the electric charge Q2 photoelectrically converted by the second photodiode PD2 is transferred to the capacitance CFD.

During a period from time T5 to time T6, the signal SSIG2 is read out and the AD conversion is performed. At time T5, the control signal TX2 transitions to the low level and the transfer switch MTX2 is turned off. At this time, the electric charge QCFD accumulated in the capacitance CFD after time T3 and the electric charge Q2 transferred during the period from time T4 to time T5 are held in the capacitance CFD. The electric charge QCFD and the electric charge Q2 are converted into a voltage signal by the capacitance CFD. Accordingly, the potential of the FD portion at this time corresponds to the potential at which a variation in the potential due to the electric charge QCFD and the electric charge Q2 is superimposed on the noise signal N1. The source follower circuit outputs the signal SSIG2 to the vertical output line. In other words, the signal SSIG2 is a signal based on each of the noise signal N1, the electric charge QCFD, and the electric charge Q2. During this period, the AD conversion is performed on the signal SSIG2 output from the vertical output line 12.

During a period from time T6 to time T8, the signal SSIG3 is read out and the AD conversion is performed. At time T6, the control signals TX2 and GC transition to the high level and the transfer switch MTX2 and the gain control switch MGC are turned on. In this case, the electric charge that is accumulated in the second photodiode PD2 and cannot be transferred to the capacitance CFD due to a shortage of the capacity of the capacitance CFD in the transfer operation during the period from time T4 to time T5 is transferred to the capacitance CFD and the capacitor element Clg which have a capacity larger compared to the case where the electric charge is transferred only to the capacitance CFD.

At time T7, the control signal TX2 transitions to the low level and the transfer switch MTX2 is turned off. At this time, the electric charge QCFD held in the capacitance CFD, the electric charge Q2, and the electric charge QClg held in the capacitor element Clg are converted into a voltage with a combined capacitance of the capacitance CFD and the capacitor element Clg. Accordingly, in this case, the potential of the FD portion corresponds to the potential at which a variation in the potential caused due to the electric charge QCFD, the electric charge QClg, and the electric charge Q2 is superimposed on the noise signal N1. The signal SSIG3 output from the source follower circuit during this period is output to the vertical output line as a signal based on the noise signal N1, the electric charge QCFD, the electric charge QClg, and the electric charge Q2. After that, the AD conversion is performed on the signal SSIG3.

A conversion gain for converting a signal charge into a voltage signal is proportional to the reciprocal of a conversion capacitance. Accordingly, if the amount of electric charge is the same, the voltage converted by the capacitance CFD and the capacitor element Clg is smaller than the voltage converted by the capacitance CFD.

During a period from time T8 to time T10, the reset signal NSIG3 is read out and the AD conversion is performed. At time T8, the control signal RES transitions to the high level and the reset switch MRES is turned on. Since the gain control switch MGC is already turned on, the potential of each of the capacitance CFD and the capacitor element Clg is reset to the potential of the power supply VDD.

At time T9, the control signal RES transitions to the low level and the reset switch MRES is turned off. The potential of each of the capacitance CFD and the capacitor element Clg at this time corresponds to the potential (noise signal N2) at which noise caused when the reset switch MRES is turned off at time T9 is superimposed on the potential of the power supply VDD. Therefore, the reset signal NSIG3 based on the noise signal N2 is output to the vertical output line 12, and then the AD conversion is performed on the reset signal NSIG3.

During a period from time T10 to time T11, the FD portion is reset again. At time T10, the control signal RES transitions to the high level, the reset switch MRES is turned on, and the capacitance CFD and the capacitor element Clg are reset. Then, the control signal GC transitions to the low level. At time T11, the control signal RES transitions to the low level. As a result, the reset switch MRES and the gain control switch MGC are turned off. At this time, the potential of the FD portion corresponds to the potential (noise signal N3) at which noise caused when the reset switch MRES and the gain control switch MGC are turned off after T10 is superimposed on the potential of the power supply VDD.

The noise signal N3 of the capacitance CFD is output from the vertical output line 12 as the reset signal NSIG1, and the AD conversion is performed on the reset signal NSIG1 during a period from time T11 to time T12.

After completion of the AD conversion on the reset signal NSIG1, at time T12, the control signal TX1 transitions to the high level and the transfer switch MTX1 is turned on, so that the electric charge Q1 accumulated in the first photodiode PD1 before time T13 is transferred to the capacitance CFD.

At time T13, the control signal TX1 transitions to the low level and the transfer switch MTX1 is turned off, and thus the electric charge accumulation period ends. In this case, the electric charge Q1 held in the capacitance CFD is output from the vertical output line 12 as the signal SSIG1 based on the signal N3, and then the AD conversion is performed on the signal SSIG1. After completion of the AD conversion on the signal SSIG1, the control signal SEL transitions to the low level and the read-out operation for one row is completed.

Each of the signals SSIG1, SSIG2, and SSIG3 and the reset signal NSIG1, NSIG2, NSIG3 read from the pixel circuit during the read-out operation for one row includes the following information as described above.

SSIG1: noise signal N3+electric charge Q1
NSIG1: noise signal N3
SSIG2: noise signal N1+electric charge QCFD+electric charge Q2
NSIG2: noise signal N1+electric charge QCFD
SSIG3: noise signal N1+electric charge QCFD+electric charge QClg+electric charge Q2
NSIG3: noise signal N2

An AD conversion operation for the photoelectric conversion apparatus according to the present exemplary embodiment will be described in detail with reference to a timing diagram illustrated in FIG. 5. FIG. 5 illustrates the control signal TX2, the potential of the reference signal output from the ramp source 63 (ramp source output), the potential of the vertical output line 12 (signal values of the reset signal NSIG2 and the signal SSIG2), the output from the comparison circuit 64, and the counter value output from the counter circuit 67.

For simplification, the present exemplary embodiment is described using the AD conversion to be performed on the signal SSIG2 and the reset signal NSIG2 as described above. First, the reset signal NSIG2 is output to the vertical output line 12. Further, the ramp source output is set to an initial value.

At time T70, the AD conversion on the reset signal NSIG2 is started and the counter circuit 67 starts the counting operation. Further, the ramp source 63 outputs the ramp signal whose potential decreases with time. In other words, the potential of the ramp source output starts to change from the initial value.

At time T71, the magnitude relation between the potential of the signal output from the ramp source 63 and the potential of the vertical output line 12 is inverted, and the signal output from the comparison circuit 64 transitions from the low level to the high level. Assuming that the count value obtained at the time is represented by ND, the column memory 65 stores the count value ND.

At time T72, sweeping of the ramp signal to a set lower limit of a potential amplitude is completed and the AD conversion on the reset signal NSIG2 is completed. The signal output from the ramp source 63 is returned to the potential before the ramp signal is output. In this case, the potential of the signal output from the ramp source 63 is higher than the potential of the vertical output line 12 and the signal output from the comparison circuit 64 transitions from the high level to the low level. The counter circuit 67 also terminates the counting operation.

At time T73, the control signal TX2 transitions to the high level and the electric charge photoelectrically converted by the second photodiode PD2 is transferred to the FD capacitance CFD, and then the signal SSIG2 corresponding to the electric charge is output to the vertical output line 12. Then, the control signal TX2 transitions to the low level.

At time T74, the AD conversion on the signal SSIG2 is started. The counter circuit 67 starts the counting operation, and the ramp source 63 outputs a ramp signal. In other words, the potential of the ramp source output starts to change from the initial value.

At time T75, the potential of the signal output from the ramp source 63 is lower than the potential of the vertical output line 12 and the signal output from the comparison circuit 64 transitions from the low level to the high level. Assuming that the count value obtained at the time is represented by SD, the column memory 65 stores the count value SD.

At time T76, sweeping of the ramp signal to the set lower limit of the potential amplitude is completed and the AD conversion on the signal SSIG2 is completed. The signal output from the ramp source 63 is returned to the potential before the ramp signal is output. The potential of the signal output from the ramp source 63 in this case is higher than the potential of the vertical output line 12 and the signal output from the comparison circuit 64 transitions from the high level to the low level. The counter circuit 67 also terminates the counting operation.

The count value SD and the count value ND obtained by the AD conversion described above are each transferred to the operation processing unit 66.

Similarly, the AD conversion can also be performed on the signals SSIG1 and SSIG3 and the reset signals NSIG1 and NSIG3, while the ramp signal is input to the comparison circuit 64 and the counter circuit 67 performs the counting operation.

As illustrated in FIG. 5, in the AD conversion on the signal SSIG2, the signal is swept from an initial value to a maximum value of the amplitude of the ramp signal. Accordingly, it takes a long period of time for the signal output from the ramp source 63 to be swept from one end of the amplitude to the other end of the amplitude. Therefore, if the same ramp signal is applied to the three signals SSIG1, SSIG2, and SSIG3, the AD conversion may be performed for an excessively long period of time. The read-out period in the photoelectric conversion apparatus is increased, which results in deterioration of the AD conversion performance of the photoelectric conversion apparatus.

In the present exemplary embodiment, three types of reset level signals NSIG1, NSIG2, and NSIG3 and AD conversion periods corresponding to the pixel signals SSIG1, SSIG2, and SSIG3 are appropriately set, respectively, thereby achieving an improvement in the AD conversion performance of the photoelectric conversion apparatus.

FIG. 6A illustrates an example of the ramp source 63. FIG. 6A is an equivalent circuit diagram of the ramp source 63. The ramp source 63 includes a resistor R and power supplies I, 2I, 4I, and 8I which are connected in series to the resistor R. The power supplies I, 2I, 4I, and 8I form paths that are connected in parallel. Switches S1, S2, S4, and S8 corresponding to the power supplies I, 2I, 4I, and 8I, respectively, are connected to a node between the resistor R and the corresponding power supply. FIG. 6B illustrates a timing diagram illustrating operations of the switches S1 to S8 and the potential (ramp source output) of the reference signal output from the ramp source 63.

In the circuit illustrated in FIG. 6A, when any one of the switches S1 to S8 is turned on, a current flows from the power supply corresponding to the turned-on switch to the resistor R. The ramp source output is expressed as VDD−R×(Iofs+nI), and the potential of the ramp source 63 decreases depending on the flowing current. The signal output from each power supply takes a value represented by a power of two with respect to "I". Accordingly, when turning on/off of each switch is switched as illustrated in the timing diagram of FIG. 6B, the current flowing to the resistor R is gradually increased by the amount corresponding to "I", and the potential of the ramp source 63 is gradually decreased by the amount corresponding to "IR".

A current source Iofs is a current source for causing an offset current to flow. The potential of the offset current when sweeping of the ramp signal is started is expressed as VDD−R×Iofs. The current source Iofs is not essential for the configuration of the ramp source 63, and the potential VDD may be set as the potential when the ramp signal is started. Any one of the power supplies I to 8I can also be used as the current source Iofs.

In the present exemplary embodiment, the ramp signal output from the ramp source 63 is the ramp signal whose potential decreases with time, but instead may be the ramp signal whose potential increases with time. In this case, the current flowing to the resistor R is gradually decreased by the amount corresponding to "I".

Operation processing to be performed on digital data obtained by the AD conversion will be described. For example, digital data obtained by performing the AD conversion on the reset signal NSIG1 at the reset level is subtracted from digital data obtained by performing the AD conversion on the signal SSIG1 that has been photoelectrically converted by the first photodiode PD1 and read out. As a result, data corresponding only to the electric charge Q1 is obtained. In the present exemplary embodiment, the reset signal NSIG1 containing information about the noise signal N3 is subtracted from the signal SSIG1 containing information about the noise signal N3 and the electric charge Q1, thereby obtaining information about the electric charge Q1.

Similarly, digital data corresponding to the reset signal NSIG2 is subtracted from digital data corresponding to the signal SSIG2, thereby obtaining data corresponding only to the electric charge Q2. In the present exemplary embodiment, the reset signal NSIG2 containing information about the noise signal N1 and the electric charge QCFD is subtracted from the signal SSIG2 containing information about the noise signal N1, the electric charge QCFD, and the electric charge Q2, thereby obtaining information about the electric charge Q2.

Thus, CDS of each signal can be achieved by subtracting a reset signal from each signal. This is because, if the read-out operation is performed in the order described above, the reset signals NSIG1 and NSIG2 can be read out and then the signals SSIG1 and SSIG2 can be read out while the FD portion is maintained in the floating state.

The present exemplary embodiment illustrates a case where the digital data corresponding to the reset signal NSIG3 is subtracted from the corresponding digital data of signal SSIG3. The signal SSIG3 contains information about the noise signal N1, the electric charge QCFD, the electric charge QClg, and the electric charge Q2, while the reset signal NSIG3 contains information about the noise signal N2. In other words, the reset level of the noise signal N2 contained in the reset signal NSIG3 is not equal to the reset level of the signal SSIG3 (noise signal N1), and thus CDS cannot be achieved for the signal SSIG3. However, since it is considered that the difference between the noise signals N1 and N2 is small, data obtained by subtracting the reset signal NSIG3 from the signal SSIG3 can be handled as data corresponding to the sum of the electric charge QCFD, the electric charge QClg, and the electric charge Q2. Further, fixed pattern noise in each pixel can be removed.

The signals SSIG1, SSIG2, and SSIG3 are hereinafter also collectively referred to as an S-signal, and the reset signals NSIG1, NSIG2, and NSIG3 are hereinafter also collectively referred to as an N-signal.

Figure 7:
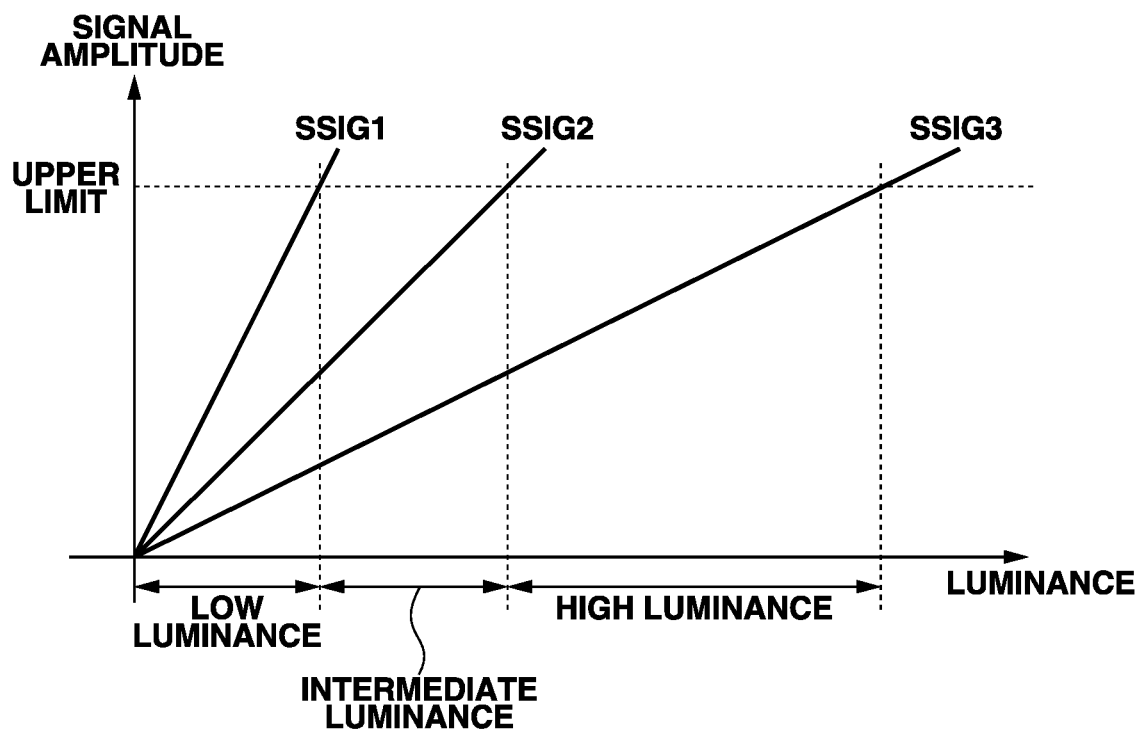
FIG. 7 is a graph illustrating a luminance and a signal amplitude of each signal in the photoelectric conversion apparatus according to the exemplary embodiment.

FIG. 7 is a graph illustrating signal values of the signals SSIG1, SSIG2, and SSIG3 with respect to a luminance. In the present exemplary embodiment, the signal values of the signals SSIG1, SSIG2, and SSIG3 are each expressed by the magnitude of a voltage. The luminance indicates the amount of incident light per unit area. For simplification, assume that a uniform amount of light is incident on the entire light-receiving surface.

If the amount of incident light per unit area is uniform, the amount of electric charge to be photoelectrically converted by the first photodiode PD1 with a larger light-receiving surface area is more than the amount of electric charge to be photoelectrically converted by the second photodiode PD2 with a smaller light-receiving surface area. The electric charge Q1 held in the first photodiode PD1 and the electric charge Q2 held in the second photodiode PD2 are converted into a charge voltage by the capacitance CFD and output as the signals SSIG1 and SSIG2. Accordingly, the signal value of the signal SSIG1 with respect to light with the same luminance is greater than that of the signal SSIG2. The first photodiode PD1 with a larger light-receiving surface area can generate a larger amount of electric charge even when the amount of light is small. A signal with an excellent S/N ratio can be obtained for low-luminance light. However, even when the light has a relatively low luminance, the voltage range that can be handled by the circuit reaches the upper limit. On the other hand, the signal SSIG2 corresponding to the electric charge generated in the second photodiode PD2 with a smaller light-receiving surface area can have a signal value at which the linearity with respect to light with a higher luminance than that of the signal SSIG1 is maintained.

Next, the reason why the signal SSIG3 can be used to photoelectrically convert light with a higher luminance than that of the signal SSIG2 will be described below. Light with a higher luminance can be photoelectrically converted because the signal SSIG3 is a signal based on a larger amount of electric charge than that of the signal SSIG2. In addition, in order to maintain the linearity even in a state where a larger amount of electric charge is generated, the conversion gain for converting an electric charge into a voltage when the signal SSIG3 is read out is lower than that for the signal SSIG2.

As described above, the signal SSIG2 is obtained by converting the electric charge Q2 held in the second photodiode PD2 into a voltage by the capacitance CFD. On the other hand, the signal SSIG3 is obtained by converting the electric charge Q2 held in the second photodiode PD2 and the excess electric charges QCFD and QClg, which have overflown from the second photodiode PD2, into a voltage by the combined capacitance of the capacitance CFD and the capacitor element Clg. Accordingly, the signal SSIG3 obtained by converting also the electric charge which has overflown from the second photodiode PD2 into a voltage can have a signal value corresponding to light with a higher luminance than that of the signal SSIG2.

Further, since the conversion gain for converting a charge signal into a voltage signal is obtained as the reciprocal of the conversion capacitance, the voltage converted by the combined capacitance of the capacitance CFD and the capacitor element Clg is smaller than the voltage converted only by the capacitance CFD. When the signal SSIG3 is read out, the capacitor element Clg is connected to the FD portion. In other words, the conversion capacitance of the FD portion is relatively large. On the other hand, when the signal SSIG3 is read out, the capacitor element Clg is not connected to the FD portion. In other words, the conversion capacitance of the FD portion is relatively small. A case where the amount of electric charge that does not overflow from the second photodiode PD2 is converted into a charge voltage will now be described by way of example. Since no electric charges overflow from the second photodiode PD2, the electric charge QCFD and the electric charge QClg are zero and thus the descriptions of the electric charges QCFD and QClg are omitted in the following description. In the operation of reading out the signal SSIG3, the electric charge Q2 is converted into a charge voltage by the combined capacitance of the capacitance CFD and the capacitor element Clg. On the other hand, in the case of reading out the signal SSIG2, the electric charge Q2 is converted into a charge voltage by the capacitance CFD. Accordingly, a variation in voltage with respect to the amount of electric charge of the signal SSIG3 is smaller than a variation in voltage with respect to the amount of electric charge of the signal SSIG2. In other words, a variation in voltage with respect to a variation in the luminance of the signal SSIG3 is decreased, which enables photoelectric conversion of light with a higher luminance than that of the signal SSIG2.

FIGS. 8A and 8B each illustrate an image of an increased dynamic range by selectively using digital data corresponding to each signal. In FIGS. 8A and 8B, the horizontal axis represents the luminance of incident light, and the vertical axis represents a signal value indicated by each digital data.

Digital data obtained after subtraction processing is performed on the signal SSIG1 is represented by CDSS1. Digital data obtained after subtraction processing is performed on the signal SSIG2 is represented by CDSS2. Digital data obtained after subtraction processing is performed on the signal SSIG3 is represented by CDSS3. In the present exemplary embodiment, the three types of signals CDSS1, CDSS2, and CDSS3 can be obtained from each pixel circuit 10 even when light with any luminance range is incident. In the case of forming an image, processing for selecting one signal from among the signals read out for each luminance as illustrated in FIGS. 8A and 8B is performed.

Accordingly, for example, digital data that corresponds to the signal SSIG1 and is obtained after the subtraction processing is used for low-luminance incident light, digital data that corresponds to the signal SSIG2 and is obtained after the subtraction processing is used for intermediate-luminance incident light, and digital data that corresponds to the signal SSIG3 and is obtained after the subtraction processing is used for high-luminance incident light. Further, operation processing for offset correction is performed on each piece of digital data, thereby achieving an increase in the dynamic range.

FIG. 8A illustrates signal values indicated by digital data corresponding to each luminance before offset correction processing is performed, and FIG. 8B illustrates values indicated by digital data after offset correction processing is performed on the data CDSS2 and CDSS3.

In general, the visibility on the low-luminance side with respect to a variation in luminance is higher than that on the high-luminance side. Accordingly, it may be desirable for the signal SSIG1 having higher sensitivity to the luminance and a lower S/N ratio to cover the low-luminance side.

As described above, since the three signals are read out through a common circuit, the upper limit of each of the three signals is uniquely determined. On the other hand, the signal values of the three signals with respect to a variation in luminance have different change ratios, and thus luminance ranges that can be covered by each signal before the signal reaches the upper limit of the voltage are different from each other (FIG. 7). The luminance range to be covered by each signal can be selected from among the luminance ranges that can be covered by each signal in image formation. Examples of digital data illustrated in FIG. 8A and the luminance range will be described below. In FIG. 8A, the range from the luminance at which the data CDSS1 reaches the upper limit to the luminance at which the data CDSS2 reaches the upper limit is selected as the luminance range to be covered by the data CDSS2 from among the luminance ranges that can be covered before the data CDSS2 reaches the upper limit. Further, the range from the luminance at which the data CDSS2 reaches the upper limit to the luminance at which the data CDSS3 reaches the upper limit is selected as the luminance range to be covered by the data CDSS3 from among the luminance ranges that can be covered before the data CDSS3 reaches the upper limit. In this case, a wide luminance range to be covered by the signal SSIG1 with a highest sensitivity can be obtained, so that a signal with an excellent S/N ratio can be preferentially used. The present exemplary embodiment is not limited to the example illustrated in FIG. 8A, but instead the luminance range to be covered by each signal can be determined in consideration of, for example, a required image quality and the length of a period in which the AD conversion is performed on a signal even when the signal overlaps another signal and thus information about the signal is not used for image formation.

As described above, the present exemplary embodiment has a configuration including the first photodiode PD1, the second photodiode PD2, and an accumulation portion. In this case, it is also possible to obtain, for example, the data CDSS2 and CDSS3 that can cover the luminance higher than the luminance range that can be covered by the data CDSS1 obtained when only the first photodiode PD1 is used. In other words, the luminance range that can be handled as digital data is increased and the dynamic range of the photoelectric conversion apparatus is increased.

FIG. 9 is a graph illustrating an example of the relationship between the luminance range to be covered by the S-signal and the signal voltage range, which is different from the example illustrated in FIG. 8A. In this example, an upper limit Vsig1 of the voltage range corresponding to the luminance range to be covered by the signal SSIG1 is smaller than an upper limit Vsig23 of the voltage range corresponding to the luminance range to be covered by the signals SSIG2 and SSIG3. As described above, it may be desirable for the signal SSIG1 to cover as high luminance as possible on the low-luminance side in consideration of the visibility with respect to a variation in luminance. However, in a case where the signal SSIG1 covers the voltage range corresponding to the upper limit Vsig23, the luminance range overlapping the luminance range to be covered by the signal SSIG1 in the luminance range that can be covered by the signal SSIG2 is covered by the signal SSIG1, and thus information about the signal SSIG2 is not used. In other words, the AD conversion to be performed on the signal SSIG2 in the luminance range overlapping the luminance range that can be covered by the signal SSIG2 and the signal SSIG1 is redundant. In the luminance region in which the signal SSIG1 has a large signal value, the signal value of the signal SSIG2 is increased to such an extent that a sufficiently high S/N ratio can be obtained. Accordingly, the upper limit Vsig1 of the voltage corresponding to the luminance range to be covered by the signal SSIG1 is set only to a voltage range smaller than the upper limit of the voltage range that can be taken by the signal value of the signal SSIG1, specifically, only to the range on the low-luminance side. As the upper limit Vsig1 of the voltage range corresponding to the luminance range to be covered by the signal SSIG1 decreases, the luminance range corresponding to the voltage range to be covered by the signal SSIG1 and the luminance range overlapping the signal SSIG2 also decrease and the AD conversion to be performed on the signal SSIG2 is optimized.

FIGS. 10A and 10B each illustrate an example of a timing diagram in a case where the AD conversion is performed in the voltage range of the S-signal illustrated in FIG. 9. The order in which the AD conversion is performed as illustrated in timing diagrams of FIGS. 10A and 10B is based on the timing diagram of FIG. 4.

FIG. 10A is a timing diagram illustrating a case where the same AD conversion period is set for all S-signals. The AD conversion period for each S-signal in this case is represented by Tprd. As described above, the upper limit of the voltage range corresponding to the luminance range to be covered by the signal SSIG1 is represented by Vsig1, and the upper limit Vsig1 is smaller than the upper limit Vsig23 of the voltage range corresponding to the luminance range to be covered by the signals SSIG2 and SSIG3. However, in the example illustrated in FIG. 10A, the ramp source output is swept with the same voltage amplitude in the AD conversion on each S-signal. Accordingly, the AD conversion period Tprd is set for all S-signals. As illustrated in FIG. 9, the voltage amplitude corresponding to the luminance range to be covered by the signal SSIG1 is smaller than that of the other signals. Therefore, the AD conversion to be performed using the ramp source output swept with the same amplitude as that of the other signals is redundant. In other words, in the case of the signal SSIG1, the AD conversion period is excessive with respect to the voltage amplitude to be handled, by the amount corresponding to a time period required for sweeping of the ramp source output in a redundant range. As illustrated in the drawings, an operation performed during a period Tsu is redundant and thus can be omitted. FIG. 10B illustrates a timing diagram in a case where the period Tsu is eliminated. The read-out period for each row can be shortened by reducing the AD conversion period for the signal SSIG1 by the amount corresponding to the period Tsu.

FIG. 11 illustrates another example of the luminance range and the signal voltage range to be covered by each S-signal.

In this example, an upper limit Vsig2 of the voltage range corresponding to the luminance range to be covered by the signal SSIG2 is smaller than an upper limit Vsig13 of the voltage range corresponding to the luminance range to be covered by the signals SSIG1 and SSIG3.

FIG. 12A is a timing diagram illustrating a case where the AD conversion is performed on each S-signal having the voltage range illustrated in FIG. 11 in the same AD conversion period. In the AD conversion on the signal SSIG2, an operation to be performed during an AD conversion period Tsu2 in view of the signal range Vsig2 covered is redundant and thus can be omitted. FIG. 12B illustrates a timing diagram in a case where the period Tsu2 is eliminated.

The read-out period for one row can be reduced by the period Tsu2 by eliminating the period Tsu2 from the AD conversion period for the signal SSIG2.

As illustrated in FIG. 13, an upper limit Vsig3 of the voltage range corresponding to the luminance range to be covered by the signal SSIG3 may be smaller than an upper limit Vsig12 of the voltage range corresponding to the luminance range to be covered by the signals SSIG1 and SSIG2.

Also, in this case, the AD conversion period for the signal SSIG3 can also be set to be shorter than the AD conversion period for the signals SSIG1 and SSIG2 as described above.

FIG. 14A illustrates an example of a timing diagram in a case where the AD conversion is performed on each S-signal in the voltage range illustrated in FIG. 13 in the same AD conversion period. FIG. 14B illustrates a timing diagram in a case where a redundant period Tsu3 is eliminated. Accordingly, the read-out period for one row can be shortened also in the case illustrated in FIG. 13.

In the present exemplary embodiment described above, a reduction in the read-out period for one row has been focused. As described above, the upper limit of the voltage that can be taken by each signal is the same. On the other hand, the range from the lower limit to the upper limit of the voltage to be covered by each signal varies depending on the signal. During the AD conversion on each signal, the ramp signal may be swept in at least the range from the lower limit to the upper limit of the voltage to be covered by each signal. As described above, the range from the lower limit to the upper limit of the voltage to be covered by at least one signal is narrower than the voltage range from the lower limit to the upper limit of the voltage that can be taken by the one signal. Accordingly, an aspect of the advantageous effect obtained by the present exemplary embodiment can be achieved by setting the range for sweeping of the ramp signal to be narrower than the voltage range that can be taken by each signal. In this case, the conversion periods for AD conversion to be performed on a plurality of signals may have the same length. For example, the range in which the ramp signal is swept is narrowed by using the ramp signal with a gentler slope than that in the case of other AD conversions. Although the advantageous effect of reducing the read-out period cannot be always obtained, the conversion can be achieved with high accuracy and the AD conversion performance can be improved.

In the present exemplary embodiment described above, the AD conversion period is shortened by using only one of the three types of S-signals. Alternatively, for example, the AD conversion period may be reduced by using two of the three types of S-signals, or different AD conversion periods may be set for the respective S-signals. While the reduction in the conversion period for each S-signal has been described above, different AD conversion periods may also be set for N-signals, respectively, if available.

As described above, in the present exemplary embodiment, the AD conversion period corresponding to the amplitude is set for each signal. Thus, in the photoelectric conversion apparatus in which a plurality of photodiodes with different light-receiving surface areas and pixels each having a capacitance are disposed, the read-out period for one row can be shortened as compared with a case where the same AD conversion period is set for all S-signals. Consequently, the AD conversion performance of the photoelectric conversion apparatus can be improved.

While an example of the arrangement of the plurality of photodiodes has been described above with reference to FIG. 3, the present exemplary embodiment is not limited to this example. The present exemplary embodiment can be applied to any arrangement, as long as a plurality of photoelectric conversion portions with different sensitivities to light is provided. The method for setting different sensitivities is not limited to the method of setting different areas for the respective photoelectric conversion portions by, for example, changing the opening area of the light-shielding film, or installing filters with different light absorption rates.

While an example of the operation of each pixel circuit has been described above with reference to the timing diagram of FIG. 4, the present exemplary embodiment is not limited to this example. The present exemplary embodiment can be applied at any timing different from the timing illustrated in the timing diagram of FIG. 4.

A second exemplary embodiment will be described with reference to the drawings.

In the present exemplary embodiment, the read-out period for each row can be shortened by changing the AD conversion resolution for each signal. The configurations of the photoelectric conversion apparatus and pixel circuits and the operations of the photoelectric conversion apparatus and pixel circuits according to the second exemplary embodiment are the same as those of the first exemplary embodiment. Accordingly, repeated descriptions are omitted and only parts different from those of the first exemplary embodiment will be mainly described.

Consider a case where the upper limits of the voltage ranges corresponding to the luminance ranges to be covered by all S-signals are the same as illustrated in FIG. 15. FIG. 16A illustrates an example of a timing diagram in a case where all ramp signals have the same slope, i.e., has the same voltage per LSB and have the same AD conversion resolution in the voltage range illustrated in FIG. 15, and also illustrates the AD conversion period for each signal and the order in which the AD conversion is performed. The order in which the AD conversion is performed on each signal is based on the timing diagram illustrated in FIG. 4.

In the timing diagram illustrated in FIG. 16A, the same voltage amplitude is covered by all S-signals and the ramp signals have the same slope, and thus the same AD conversion period is set for all S-signals.

As described above, it is known that a variation in luminance on the low-luminance side can be more easily recognized than a variation in luminance on the high-luminance side. Accordingly, in the present exemplary embodiment, the AD conversion resolution on the low-luminance side with high visibility is set to a higher level, the AD conversion resolution on the high-luminance side with low visibility is set to a lower level, and the AD conversion period is set according to each resolution, thereby improving the AD conversion performance.

FIG. 16B is a timing diagram in a case where the AD conversion resolution for the signal SSIG3 and the reset signal NSIG3 on the high-luminance side is set to be lower than that for the other signals. To decrease the resolution, the ramp signal with a steeper slope is set and the voltage per LSB is increased. As illustrated in FIG. 16B, the resolution for the signal SSIG3 and the reset signal NSIG3 is decreased, and thus the ramp signal has a steeper slope. Accordingly, the period from the time when the signal output from the ramp source 63 starts to be swept to the time when the signal reaches the potential of a maximum amplitude is shorter compared to the case where the resolution is high. Therefore, the AD conversion period can be shortened as compared with a case where the AD conversion is performed on all S-signals with the same resolution.

Assume that the AD conversion period for the signal SSIG3 in a case where the AD conversion resolution is high is represented by Tps, the AD conversion period for the reset signal NSIG3 in a case where the AD conversion resolution is high is represented by Tpn, the AD conversion period for the signal SSIG3 in a case where the AD conversion resolution is low is represented by Tps2, and the AD conversion period for the reset signal NSIG3 in a case where the AD conversion resolution is low is represented by TpN2. In this case, the period of (Tps−Tps2+Tpn−TpN2) can be shortened by decreasing the resolution for the signal SSIG3 and the reset signal NSIG3, and accordingly the read-out period for each row can be shortened.

In this case, the AD conversion resolution on the low-luminance side with high visibility is set to a higher level and the AD conversion resolution on the high-luminance side with low visibility is set to a lower level, and thus there is less effect on the image quality. In addition, the AD conversion resolution for each signal may be set in consideration of the image quality.

The present exemplary embodiment described above illustrates an example where the AD conversion resolution is decreased using one type of S-signal and one type of N-signal at the reset level of the S-signal. Alternatively, for example, the AD conversion resolution may be changed using two types of S-signals and two types of N-signals at the reset levels of the S-signals. Still alternatively, the AD conversion resolution for the signal SSIG2 and the reset signal NSIG2, which cover an intermediate luminance, may be set to be lower than the AD conversion resolution for the signal SSIG1 and the reset signal NSIG1 on the low-luminance side and to be higher than the AD conversion resolution for the signal SSIG3 and the reset signal NSIG3 on the high-luminance side. In this manner, the AD conversion resolution is decreased using two or more S-signals and N-signals and the AD conversion resolution is set for each signal, thereby making it possible to further shorten the read-out period for one row. In addition, it is expected that a high frame rate can be obtained.

In the present exemplary embodiment, the AD conversion period can be shortened by setting the AD conversion resolution for each signal. In addition, the technique for setting the AD conversion period depending on the signal amplitude as described above in the first exemplary embodiment may also be used. For example, while the same AD conversion resolution may be set for the signals SSIG1 and SSIG2, the AD conversion periods for the signals SSIG1 and SSIG2 may have different lengths, and the AD conversion resolution for the signal SSIG3 may be set to be lower than that for the signals SSIG1 and SSIG2.

If the signals have different AD conversion resolutions, the gradation for AD conversion on each signal may be set as follows. That is, for example, the gradation on the low-luminance side may be set to 12 bits, the gradation on the high-luminance side may be set to 10 bits, and an intermediate luminance may be set to 11 bits.

A third exemplary embodiment will be described with reference to the drawings. In the present exemplary embodiment, the read-out period for each row is shortened by applying an offset to the potential when sweeping of the ramp signal is started. The configurations of the photoelectric conversion apparatus and pixel circuits and the operations of the photoelectric conversion apparatus and pixel circuits according to the third exemplary embodiment are the same as those of the first exemplary embodiment. Accordingly, repeated descriptions are omitted and only parts different from those of the first exemplary embodiment will be mainly described.

Consider a case where the upper limits of the voltage ranges to be covered by all S-signals are the same as illustrated in FIG. 15. FIG. 17A illustrates an example of a timing diagram in which the ramp signals have the same slope and have the same potential is set when sweeping of the ramp signal is started in the voltage range illustrated in FIG. 15, and also illustrates the AD conversion period for each signal and the order in which the AD conversion is performed. The order in which the AD conversion is performed on the signals is based on the timing diagram illustrated in FIG. 4.

In the timing diagram illustrated in FIG. 17A, the same voltage amplitude is covered by all S-signals and the ramp signals have the same slope and the same potential when sweeping is started. Accordingly, the same AD conversion period is set for all S-signals.

FIG. 15 illustrates a case where all the signals SSIG1, SSIG2, and SSIG3 cover a voltage range Vsig123. As described above, the luminance range overlapping the signal SSIG1 in the luminance range that can be covered by the signal SSIG2 is covered by the signal SSIG1, and information about the signal SSIG2 is not used. Similarly, the luminance range overlapping the signal SSIG2 in the luminance range that can be covered by the signal SSIG3 is covered by the signal SSIG2, and information about the signal SSIG3 is not used. In other words, the AD conversion in the luminance range overlapping the signal SSIG1 in the luminance range that can be covered by the signal SSIG2 and the AD conversion in the luminance range overlapping the signal SSIG2 in the luminance range that can be covered by the signal SSIG3 are redundant. Therefore, in the present exemplary embodiment, an offset is set to the potential when sweeping of the ramp signal is started, and the AD conversion is performed only on the luminance for which information about each signal is used. For example, as the ramp signal used for performing the AD conversion on the signal SSIG2, a signal obtained by applying an offset to the ramp signal used for performing the AD conversion on the signal SSIG1 is used, and the AD conversion is not performed on signals in the luminance range overlapping the signal SSIG1. With this configuration, the period for AD conversion for each row can be shortened by the amount corresponding to the period for AD conversion on the overlapping luminance range, thereby improving the AD conversion performance.

FIG. 17B is a timing diagram in a case where the potential at a time when the ramp signal is started is adjusted in the AD conversion on the signal SSIG2 and the signal SSIG3. As illustrated in FIG. 17B, the AD conversion is not performed on the overlapping luminance range for which the AD conversion result is not used. Accordingly, the AD conversion period can be shortened as compared with a case where the AD conversion is performed on all S-signals using the ramp signal that starts to be swept from the same potential.

In other words, in the present exemplary embodiment, the signals have different potentials when sweeping of the ramp signal is started. While the same upper limit is set for the voltage range of the three S-signals illustrated in FIG. 15, lower limits of voltage ranges corresponding to the luminance ranges to be covered by the signals are different. During the AD conversion on each signal, it is sufficient for the ramp signal to be swept from the lower limit to the upper limit of the voltage range of each signal. Accordingly, the potential at the time the ramp signal starts to be swept may be set differently for each signal by setting the potential so as to correspond to the lower limit of the voltage range corresponding to the luminance range to be covered by the corresponding signal.

Assume that the AD conversion period for each of the signals SSIG1 to SSIG3 in a case where the same potential is set at the time the ramp signal for AD conversion is started is represented by Tps, and the AD conversion period for each of the signals SSIG2 and SSIG3 in a case where the potential is adjusted at the time the ramp signal is started is represented by Tps2. In this case, the period of (Tps−Tps2+Tpn−TpN2) can be shortened by decreasing the resolution for the signal SSIG3 and the reset signal NSIG3, and the read-out period for one row can be shortened.

While an example of the operation according to the present exemplary embodiment has been described above with reference to FIG. 17B, the present exemplary embodiment is not limited to this example. For example, a change rate per unit time of the ramp signal may be set to a relatively large value for the range in which AD conversion results of other signals are used, and in a case where the AD conversion is performed on the range in which the AD conversion result is used, a change rate per unit time of the ramp signal may be set to a relatively small value.

A fourth exemplary embodiment will be described with reference to the drawings. In the present exemplary embodiment, each signal is amplified and the period for AD conversion is changed for each signal, thereby shortening the read-out period for one row. The configurations of the photoelectric conversion apparatus and pixel circuits and the operations of the photoelectric conversion apparatus and pixel circuits according to the fourth exemplary embodiment are the same as those of the first exemplary embodiment. Accordingly, repeated descriptions are omitted and only parts different from those of the first exemplary embodiment will be mainly described.

Figure 18:
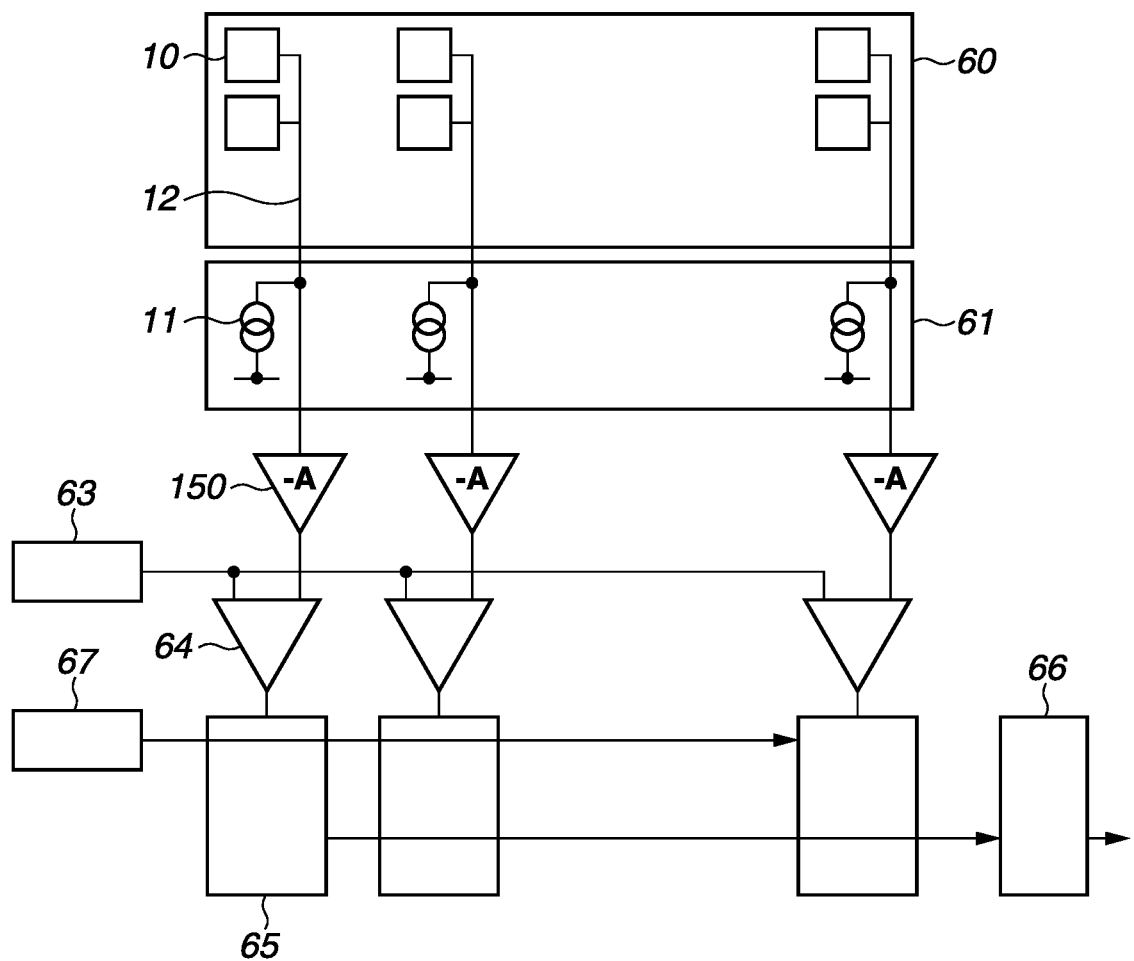
FIG. 18 is a schematic diagram illustrating the photoelectric conversion apparatus according to the exemplary embodiment.

FIG. 18 is a schematic diagram illustrating an example of the photoelectric conversion apparatus according to the present exemplary embodiment. The photoelectric conversion apparatus illustrated in FIG. 18 differs from the photoelectric conversion apparatus illustrated in FIG. 1 in that each column amplifier 150 is disposed between the corresponding comparison circuit 64 and the vertical output line 12. The column amplifier 150 is an example of an amplifier circuit that amplifies a signal from the vertical output line 12 and inputs the amplified signal to the comparison circuit 64. Each column amplifier 150 is an inverting amplifier and the gain of the column amplifier 150 is variable. Descriptions of circuits that are similar to those illustrated in FIG. 4 are omitted.

Figure 19:
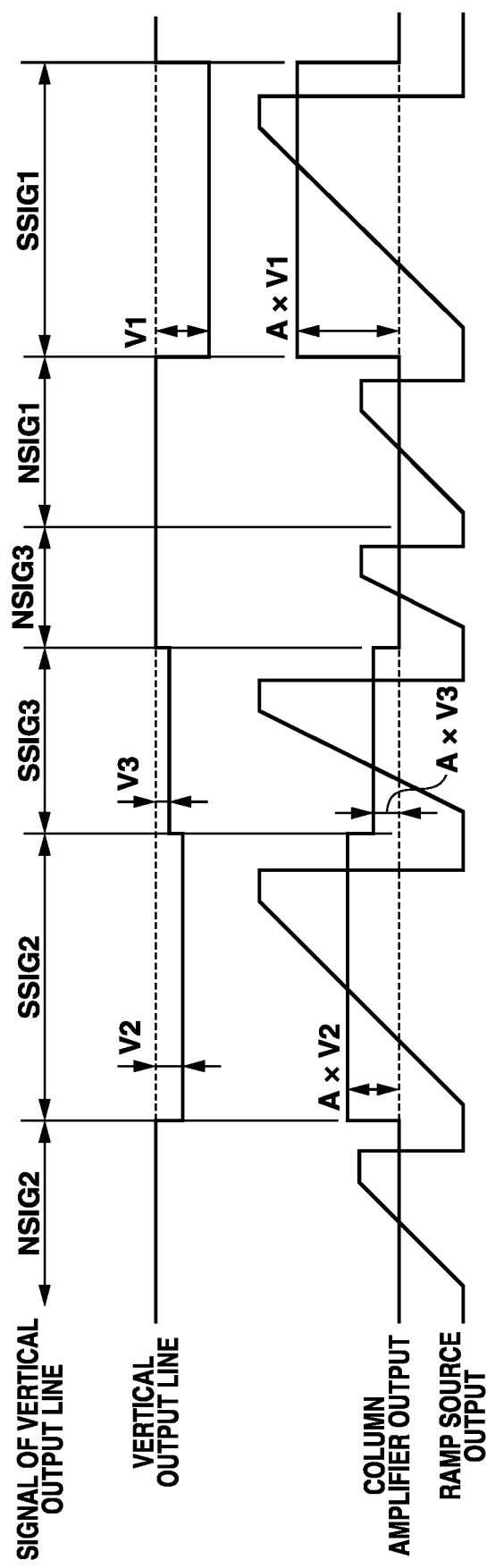
FIG. 19 is a timing diagram illustrating an operation of the AD conversion portion in the photoelectric conversion apparatus according to the exemplary embodiment.

FIG. 19 is a timing diagram illustrating an AD conversion operation when a certain amount of light is incident on the photodiodes PD1 and PD2 in the photoelectric conversion apparatus illustrated in FIG. 18. Since the column amplifier 150 is an inverting amplifier, the potential of the vertical output line 12 is inverted and output in the timing diagram illustrated in FIG. 19. Accordingly, as illustrated in FIG. 19, the ramp source 63 outputs the signal whose potential is inverted from the signal of the ramp source 63 when the column amplifier 150 is not provided in the configuration described above. In other words, during the AD conversion, the ramp source 63 outputs the ramp signal whose potential increases with time.

In this example, in the AD conversion on the signal SSIG3 and the reset signal NSIG3, the read-out period for one row is shortened by using the technique for setting the AD conversion resolution to be lower than that for the other signals as described above in the second exemplary embodiment. The amplification gain of the column amplifier 150 is represented by "A", and the signal of the vertical output line 12 is amplified. When the amplitude of the signal SSIG2 is represented by V2, the signal amplitude of the column amplifier output is expressed as A×V2. When the amplitude of the signal SSIG3 is represented by V3, the signal amplitude of the column amplifier output is expressed as A×V3. When the amplitude of the signal SSIG1 is represented by V1, the signal amplitude of the column amplifier output is expressed as A×V1. Also for each N-signal, the signal amplitude of the column amplifier output is amplified with the same gain as the corresponding S-signal.

Also, in the case where the column amplifier 150 is provided, like in the present exemplary embodiment, depending on the signal amplitude of each signal, only the AD conversion period may be changed for each signal without changing the AD conversion resolution. Further, a signal for which the AD conversion period is shortened without changing the AD conversion resolution and a signal for which the AD conversion period is shortened by changing the AD conversion resolution may be used. For example, the signals SSIG1 and SSIG2 may have the same AD conversion resolution and different AD conversion periods, and the AD conversion resolution for the signal SSIG3 may be set to be lower than that for the signals SSIG1 and SSIG2.

Further, the gain of the column amplifier 150 may be different for each signal. For example, the gain of each of the signal SSIG1 and the reset signal NSIG1, which are signals on the low-luminance side where noise is easily recognized, can be set to be larger than the gain of the other signals. When the gain is increased to thereby increase the pixel signal, noise caused by the column amplifier 150 or the comparison circuit 64 is relatively smaller than the pixel signal and pixel noise, and thus it is expected that the S/N ratio can be improved.

Further, as illustrated in FIG. 7, based on the relationship between the luminance and the signal amplitude of each S-signal, the same amplitude may be set for the signals amplified by the corresponding column amplifier 150. For example, the gains of the signal SSIG1 with a largest signal amplitude with respect to the luminance and the reset signal NSIG1 corresponding to the signal SSIG1 are set to a lowest level, and the gains of the signal SSIG3 with a smallest signal amplitude with respect to the luminance and the reset signal NSIG3 corresponding to the signal SSIG3 are set to a highest level. The gain of each of the signal SSIG2 and the reset signal NSIG2 is set to an intermediate level. By setting the gain of the column amplifier for each signal, it becomes possible to make the amplitudes of the column amplifier output substantially the same regardless of the signal. Consequently, the occurrence of a redundant operation in the AD conversion due to the amplitude of a specific signal becoming extremely small can be prevented. In other words, the AD conversion performance can be improved.

A fifth exemplary embodiment will be described with reference to the drawings. In the present exemplary embodiment, the AD conversion resolution is set while the read-out period for each row is maintained, thereby optimizing the AD conversion period. The configurations of the photoelectric conversion apparatus and pixel circuits and the operations of the photoelectric conversion apparatus and pixel circuits according to the fifth exemplary embodiment are the same as those of the first exemplary embodiment. Accordingly, repeated descriptions are omitted and only parts different from those of the first exemplary embodiment will be mainly described.

Figure 20:
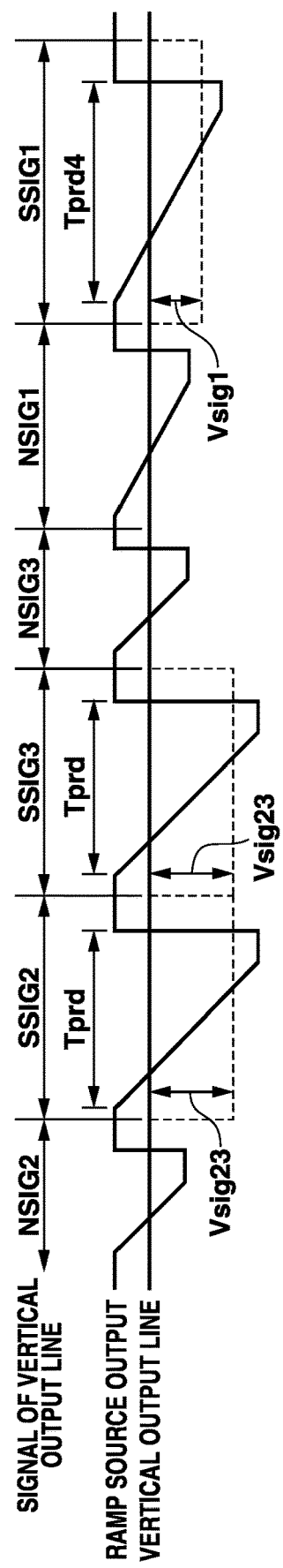
FIG. 20 is a timing diagram illustrating an operation of the AD conversion portion in the photoelectric conversion apparatus according to the exemplary embodiment.

As described above, in the timing diagram of FIG. 10A, the same AD conversion period is set for all S-signals, and in the case of the signal SSIG1, the operation to be performed during the period Tsu is redundant. In the present exemplary embodiment, the resolution for the signal SSIG1 is set by making use of the period Tsu, thereby optimizing the AD conversion period. FIG. 20 illustrates a timing diagram when the resolution for the signal SSIG1 is set to be higher than that for the other signals by making use of the redundant period Tsu. In the case of increasing the resolution, the ramp signal with a gentler slope is set to thereby decrease the voltage per LSB. In FIG. 20, the resolution for each of the signal SSIG1 and the reset signal NSIG1 is increased, and thus the ramp signal has a gentle slope as illustrated in FIG. 20. Accordingly, the period from the time when the signal output from the ramp source 63 starts to be swept to the time when the signal reaches the potential of the maximum amplitude is longer than that when the resolution is low. Therefore, the period Tsu can be used and the image quality on the low-luminance side can be enhanced while the read-out period for each row is not changed.

Further, in the present exemplary embodiment, the upper limit Vsig1 at which the ramp signal is swept for AD conversion on the signal SSIG1 is narrower than at least the upper limit Vsig23, and is narrower than the voltage range that can be taken by each signal. Therefore, the fifth exemplary embodiment can be achieved by setting the amplitude range in which the ramp signal is swept to be narrower than the voltage range that can be taken by the signal.

Figure 21:
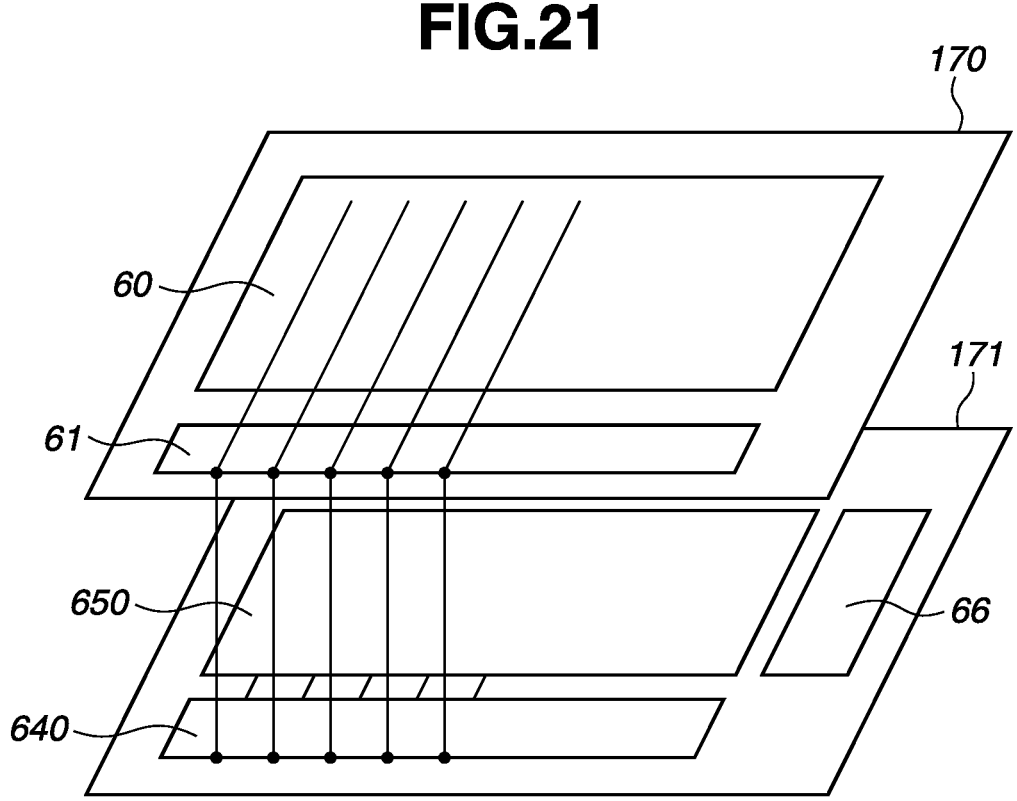
FIG. 21 is a schematic diagram illustrating a photoelectric conversion apparatus having a stacked structure.

While the first to fifth exemplary embodiments have been described above with reference to the schematic diagrams of the photoelectric conversion apparatus illustrated in FIGS. 1 and 18, all circuits illustrated in FIGS. 1 and 18 may be disposed on a single semiconductor substrate. Further, a stacked structure in which the circuits are disposed on two or more substrates as illustrated in FIG. 21 and the substrates are bonded together may be used. A photoelectric conversion apparatus having the stacked structure illustrated in FIG. 21 includes a first substrate 170 and a second substrate 171.

The photoelectric conversion apparatus having the stacked structure illustrated in FIG. 21 is an example of a configuration in which the schematic diagram of FIG. 1 is divided into two substrates. In this example, the pixel portion 60 and the current source group 61 are disposed on the first substrate 170. A comparison circuit group 640 including comparison circuits 64 corresponding to all columns, a memory group including column memories 65 corresponding to all columns, and the operation processing unit 66 are disposed on the second substrate 171. Although not illustrated in FIG. 21, the ramp source 63 and the counter circuit 67 are also disposed on the second substrate 171. Like in the photoelectric conversion apparatus illustrated in FIG. 18, the column amplifiers 150 corresponding to all columns may be disposed on one of the first substrate 170 and the second substrate 171. The photoelectric conversion apparatus having the stacked structure illustrated in FIG. 21 is merely an example, and the present exemplary embodiment is not limited to this example. For example, the comparison circuit group 640 may be disposed on the first substrate 170. In the example illustrated in FIG. 21, the first substrate 170 and the second substrate 171 are electrically connected by each column, but instead, may be connected, for example, by each pixel. FIG. 21 illustrates an example of the stacked structure in which two substrates are stacked. Alternatively, for example, a stacked structure in which three substrates are stacked may be formed by classifying the circuits or adding a circuit or a function.

In the configuration examples illustrated in FIGS. 1 and 18, the output terminal of the ramp source 63 is connected to the input terminal of each comparison circuit 64. Alternatively, a shared buffer circuit may be disposed in each row or in a plurality of columns between the output terminal of the ramp source 63 and each comparison circuit 64, and the signal output from the ramp source 63 may be buffered and the buffered signal may be input to the comparison circuit 64.

While the first to fifth exemplary embodiments described above illustrate a rope-type AD as an AD conversion method, the disclosure is not limited to this example. For example, a successive approximation method may be used as the AD conversion method and the number of successive approximations can be counted. If available, any other AD conversion methods may also be used.

While the first to fifth exemplary embodiments described above illustrate an example of the operation based on the timing diagram of FIG. 4, the disclosure is not limited to this example. For example, a mechanism for performing a sample-and-hold operation on each signal may be provided to output a signal different from the signal subjected to the sample-and-hold operation to the vertical output line 12 while the AD conversion is being performed on the signal subjected to the sample-and-hold operation.

Sixth Exemplary Embodiment

Figure 22:
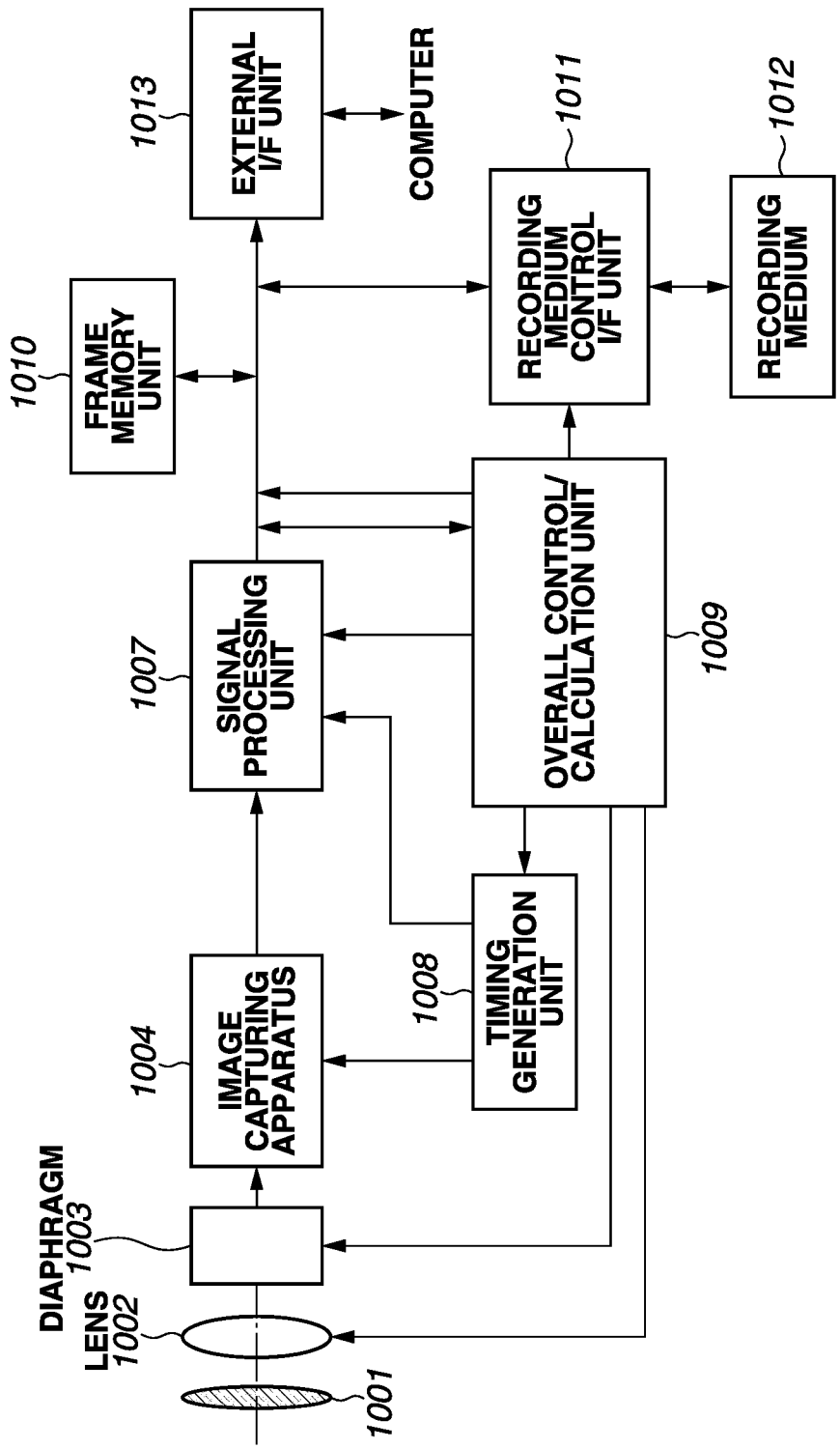
FIG. 22 is a block diagram illustrating an image capturing system according to an exemplary embodiment.

An image capturing system according to a sixth exemplary embodiment will be described. Examples of the image capturing system include a digital still camera, a digital camcorder, a camera head, a copying machine, a facsimile machine, a cellular phone, an on-vehicle camera, and an observatory. FIG. 22 is a block diagram illustrating a digital still camera as an example of the image capturing system.

As illustrated in FIG. 22, a barrier 1001 is a barrier for protecting a lens. A lens 1002 forms an optical image of a subject on an image capturing apparatus 1004. A diaphragm 1003 is for varying the amount of light which has passed through the lens 1002. As the image capturing apparatus 1004, any one of the image capturing apparatuses described in the above-described exemplary embodiments is used.

A signal processing unit 1007 performs processing, such as correction and data compression, on a pixel signal output from the image capturing apparatus 1004, and obtains an image signal. As illustrated in FIG. 22, a timing generation unit 1008 outputs various timing signals to the image capturing apparatus 1004 and the signal processing unit 1007, and an overall control/calculation unit 1009 controls the overall operation of the digital still camera. A frame memory unit 1010 is used to temporarily store image data. An interface unit 1011 is used to record data on a recording medium or to read out data from the recording medium. A recording medium 1012 is a detachable recording medium, such as a semiconductor memory, which is used to record or read out captured image data. An interface unit 1013 is used to communicate with an external computer or the like.

The image capturing system may include at least the image capturing apparatus 1004 and the signal processing unit 1007 that processes the pixel signal output from the image capturing apparatus 1004. In this case, the other components are disposed outside of the image capturing system.

As described above, in the image capturing system according to the present exemplary embodiment, the image capturing apparatus according to any one of the first to fifth exemplary embodiments is used as the image capturing apparatus 1004. This configuration makes it possible to increase the dynamic range of an image obtained from the image capturing apparatus.

Figure 23B:
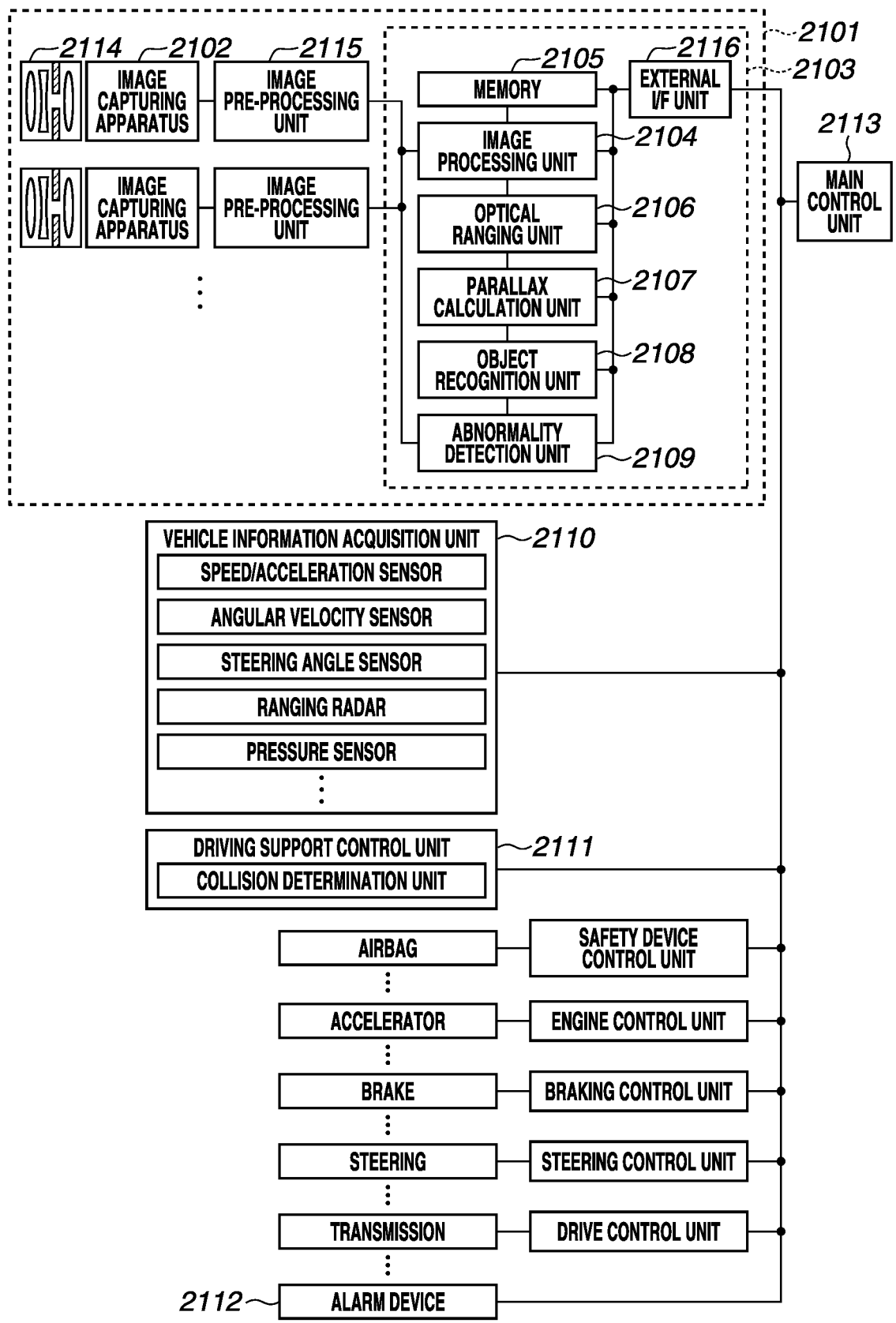
FIG. 23B is a block diagram illustrating the internal structure of the moving body according to the exemplary embodiment.

A moving body according to a seventh exemplary embodiment will be described. The moving body according to the seventh exemplary embodiment is an automobile including an on-vehicle camera. FIG. 23A schematically illustrates the appearance of an automobile 2100, and FIG. 23B illustrates the main internal structure of the automobile 2100. The automobile 2100 includes an image capturing apparatus 2102, an image capturing system integrated circuit (e.g., an application specific integrated circuit (ASIC)) 2103, an alarm device 2112, and a main control unit 2113.

As the image capturing apparatus 2102, the image capturing apparatus described above in the exemplary embodiments is used. Upon receiving a signal indicating an abnormality from the image capturing system, the vehicle sensor, the control unit, or the like, the alarm device 2112 issues an alarm to a driver. The main control unit 2113 controls the operations of the image capturing system, the vehicle sensor, the control unit, and the like in an integrated manner. The automobile 2100 may not include the main control unit 2113. In this case, the image capturing system, the vehicle sensor, and the control unit each include a communication interface, and transmit and receive control signals via a communication network (e.g., Controller Area Network (CAN) standards).

FIG. 23B is a block diagram illustrating a system configuration of the automobile 2100. The automobile 2100 includes a first image capturing apparatus 2102 and a second image capturing apparatus 2102. In other words, the on-vehicle camera according to the present exemplary embodiment is a stereo camera. An optical unit 2114 forms a subject image on the image capturing apparatus 2102. The pixel signal output from the image capturing apparatus 2102 is processed by an image pre-processing unit 2115 and is then transmitted to the image capturing system integrated circuit 2103. The image pre-processing unit 2115 performs processing such as S/N calculation and addition of a synchronous signal.

The image capturing system integrated circuit 2103 includes an image processing unit 2104, a memory 2105, an optical ranging unit 2106, a parallax calculation unit 2107, an object recognition unit 2108, an abnormality detection unit 2109, and an external interface (I/F) unit 2116. The image processing unit 2104 processes the pixel signal and generates an image signal. Further, the image processing unit 2104 performs correction processing on the image signal and interpolation processing on an abnormal pixel. The memory 2105 temporarily holds the image signal. The memory 2105 may also store the known position of the abnormal pixel in the image capturing apparatus 2102. The optical ranging unit 2106 performs focusing or ranging of a subject using the image signal. The parallax calculation unit 2107 performs subject matching (stereo matching) using a parallax image. The object recognition unit 2108 analyzes the image signal and recognizes a subject, such as an automobile, a person, a sign, or a road. The abnormality detection unit 2109 detects a failure or an erroneous operation in the image capturing apparatus 2102. Upon detecting a failure or an erroneous operation, the abnormality detection unit 2109 sends a signal indicating that an abnormality is detected to the main control unit 2113. The external I/F unit 2116 intermediates transmission and reception of information between each part of the image capturing system integrated circuit 2103 and the main control unit 2113, various control units, and the like.

The automobile 2100 includes a vehicle sensor 2110 and a driving support control unit 2111. The vehicle sensor 2110 includes a speed/acceleration sensor, an angular velocity sensor, a steering angle sensor, a ranging radar, and a pressure sensor.

The driving support control unit 2111 includes a collision determination unit. The collision determination unit determines whether there is a possibility of collision with an object based on information from the optical ranging unit 2106, the parallax calculation unit 2107, and the object recognition unit 2108. The optical ranging unit 2106 and the parallax calculation unit 2107 are examples of a distance information acquisition unit that acquires information about a distance to an object. Specifically, the distance information is information about a parallax, a defocus amount, a distance to an object, or the like. The collision determination unit may determine the possibility of collision with an object based on any one of the pieces of distance information. The distance information acquisition unit may be implemented by a hardware module designed for an exclusive use, or may be implemented by a software module.

While the present exemplary embodiment described above illustrates an example where the driving support control unit 2111 controls the automobile 2100 so as to prevent the automobile 2100 from colliding with another object, the present exemplary embodiment can also be applied to, for example, a control operation for automatic driving by following another vehicle, and a control operation for automatic driving to prevent a vehicle from deviating from a lane.

The automobile 2100 further includes drive units used for travelling, such as an airbag, an accelerator, a brake, a steering, and a transmission. The automobile 2100 further includes control units for controlling the drive units. Each control unit controls the corresponding drive unit based on a control signal from the main control unit 2113.

The image capturing system according to the present exemplary embodiment is not limited to an automobile, but instead can be applied to, for example, a moving body (moving apparatus), such as a ship, an aircraft, or an industrial robot. In addition, the present exemplary embodiment is not limited to a moving body, but instead can be applied to devices that widely use object recognition, such as an intelligent transportation system (ITS).

As described above, in the automobile according to the present exemplary embodiment, any one of the image capturing apparatuses according to the first to fifth exemplary embodiments is used as the image capturing apparatus 2102. According to this configuration, it is possible to increase the dynamic range of an image obtained from the image capturing apparatus.

According to the exemplary embodiments described above, it is possible to improve the AD conversion performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A photoelectric conversion apparatus comprising:
a pixel including a first photoelectric conversion portion, a second photoelectric conversion portion, an accumulation portion configured to accumulate a signal charge in a location other than the first photoelectric conversion portion and the second photoelectric conversion portion and an output circuit; and
an analog-to-digital conversion circuit configured to perform an analog-to-digital conversion on a signal based on a signal charge generated in the first photoelectric conversion portion and on a signal based on a signal charge generated in the second photoelectric conversion portion,
wherein the output circuit reads out a first signal based on a first signal charge accumulated in the first photoelectric conversion portion during an electric charge accumulation period, a second signal based on a second signal charge accumulated in the second photoelectric conversion portion during the electric charge accumulation period, and a third signal based on a third signal charge, the third signal charge being generated in the second photoelectric conversion portion and accumulated in the accumulation portion during the electric charge accumulation period, and
wherein conversion resolutions for analog-to-digital conversion to be performed on at least two of the first, second, or third signals are different.

2. The photoelectric conversion apparatus according to claim 1, wherein a first resolution for converting the first signal into digital data is different from a second resolution for converting the second signal into digital data.

3. The photoelectric conversion apparatus according to claim 1, wherein a first resolution for converting the first signal into digital data is different from a third resolution for converting the third signal into digital data.

4. The photoelectric conversion apparatus according to claim 1, wherein a second resolution for converting the second signal into digital data is different from a third resolution for converting the third signal into digital data.

5. The photoelectric conversion apparatus according to claim 1, further comprising a microlens,
wherein in the pixel, the first photoelectric conversion portion and the second photoelectric conversion portion are disposed below the microlens.

6. The photoelectric conversion apparatus according to claim 1, wherein the accumulation portion includes a capacitor element configured to accumulate the third signal charge.

7. The photoelectric conversion apparatus according to claim 6, wherein the pixel includes a capacitor element electrically connected to an input node of the output circuit via a transistor.

8. The photoelectric conversion apparatus according to claim 7, wherein the capacitor element accumulates the third signal charge and forms the accumulation portion.

9. The photoelectric conversion apparatus according to claim 8, wherein the capacitor element and the input node accumulate the third signal charge and form the accumulation portion.

10. The photoelectric conversion apparatus according to claim 7,
wherein the first signal and the second signal are output in a state where the input node of the output circuit is not connected to the capacitor element, and
wherein the third signal charge is output in a state where the input node of the output circuit is connected to the capacitor element.

11. The photoelectric conversion apparatus according to claim 1, further comprising:
a first filter present on the first photoelectric conversion portion; and
a second filter present on the second photoelectric conversion portion,
wherein a light transmittance of the first filter is different from a light transmittance of the second filter.

12. The photoelectric conversion apparatus according to claim 1, wherein a sensitivity of the first photoelectric conversion portion is higher than a sensitivity of the second photoelectric conversion portion.

13. The photoelectric conversion apparatus according to claim 12, wherein a conversion period for a first analog-to-digital conversion to be performed on the first signal is longer than a conversion period for a second analog-to-digital conversion to be performed on the second signal.

14. The photoelectric conversion apparatus according to claim 13,
wherein the analog-to-digital conversion circuit includes a reference signal source configured to output a reference signal and a comparator configured to compare the signal with the reference signal, and
wherein a signal obtained by applying an offset to the reference signal used for the first analog-to-digital conversion is set as the reference signal for the second analog-to-digital conversion.

15. The photoelectric conversion apparatus according to claim 12, wherein a conversion period for a first analog-to-digital conversion to be performed on the first signal is shorter than a conversion period for a second analog-to-digital conversion to be performed on the second signal.

16. The photoelectric conversion apparatus according to claim 12, wherein a conversion period for a first analog-to-digital conversion to be performed on the first signal is longer than a conversion period for a third analog-to-digital conversion to be performed on the third signal.

17. The photoelectric conversion apparatus according to claim 12, wherein a conversion period for a first analog-to-digital conversion to be performed on the first signal is shorter than a conversion period for a third analog-to-digital conversion to be performed on the third signal.

18. The photoelectric conversion apparatus according to claim 12, wherein a conversion period for a second analog-to-digital conversion to be performed on the second signal is longer than a conversion period for a third analog-to-digital conversion to be performed on the third signal.

19. The photoelectric conversion apparatus according to claim 12, wherein a conversion period for a second analog-to-digital conversion to be performed on the second signal is shorter than a conversion period for a third analog-to-digital conversion to be performed on the third signal.

20. The photoelectric conversion apparatus according to claim 1, wherein an area of a light-receiving surface of the first photoelectric conversion portion is larger than an area of a light-receiving surface of the second photoelectric conversion portion.

21. The photoelectric conversion apparatus according to claim 20,
wherein the analog-to-digital conversion circuit includes a reference signal source configured to output a reference signal and a comparator configured to compare the signal with the reference signal, and
wherein a change rate of the reference signal used for the second analog-to-digital conversion with respect to time changes from a first change rate to a second change rate during the conversion period for the second analog-to-digital conversion, the second change rate being smaller than the first change rate.

22. The photoelectric conversion apparatus according to claim 1,
wherein the analog-to-digital conversion circuit includes a reference signal source configured to output a reference signal and a comparator configured to compare the signal with the reference signal, and
wherein the photoelectric conversion apparatus obtains digital data in accordance with a time period from a time when sweeping of the reference signal is started to a time when a magnitude relation between the signal and the reference signal is inverted.

23. The photoelectric conversion apparatus according to claim 22, wherein a time period for sweeping of the reference signal from one end of an amplitude of the reference signal to another end of the amplitude of the reference signal corresponds to a length of the conversion period.

24. The photoelectric conversion apparatus according to claim 22,
wherein the analog-to-digital conversion circuit includes a counter, and
wherein a time period from a time when the counter starts counting to a time when the counter finishes counting corresponds to a length of the conversion period.

25. The photoelectric conversion apparatus according to claim 1, wherein a length of the conversion period varies depending on a difference in the number of successive approximations in the analog-to-digital conversion.

26. The photoelectric conversion apparatus according to claim 1, further comprising an amplifier circuit configured to amplify the first, second, and third signals output from the output circuit,
wherein different amplification gains are applied to at least two of the first, second, or third signals.

27. The photoelectric conversion apparatus according to claim 1, wherein the photoelectric conversion apparatus has a configuration in which a plurality of semiconductor substrates is stacked.

28. The photoelectric conversion apparatus according to claim 1, wherein reset signals corresponding to the first, second, and third signals, respectively, are output.

29. The photoelectric conversion apparatus according to claim 28, wherein the first, second, and third signals and the reset signals corresponding to the first, second, and third signals, respectively, are read out in an order of the reset signal corresponding to the second signal, the second signal, the third signal, the reset signal corresponding to the third signal, the reset signal corresponding to the first signal, and the first signal.

30. An image capturing system comprising:
a photoelectric conversion apparatus according to claim 1; and
a processing apparatus configured to perform processing on a signal output from the photoelectric conversion apparatus.

31. A moving body comprising:
a photoelectric conversion apparatus according to claim 1;
a processing apparatus configured to perform processing on a signal output from the photoelectric conversion apparatus; and
a control unit configured to control the moving body based on a result of the processing.

32. A photoelectric conversion apparatus comprising:
a pixel including a photoelectric conversion portion, a capacitor element, and an output circuit, the output circuit including an input node to receive a signal charge generated in the photoelectric conversion portion and being configured to output a signal based on the signal charge; and
an analog-to-digital conversion circuit configured to perform an analog-to-digital conversion on the signal,
wherein the capacitor element is electrically connected to the input node via a transistor and forms a part of a capacitance of the input node, and
wherein conversion resolutions for analog-to-digital conversion to be performed on a first signal output from the output circuit in a case where the capacitor element and the input node are electrically connected and on a second signal output from the output circuit in a case where the capacitor element and the input node are not electrically connected are different.

33. An image capturing system comprising:
a photoelectric conversion apparatus according to claim 32; and
a processing apparatus configured to perform processing on a signal output from the photoelectric conversion apparatus.

34. A moving body comprising:
a photoelectric conversion apparatus according to claim 32;
a processing apparatus configured to perform processing on a signal output from the photoelectric conversion apparatus; and
a control unit configured to control the moving body based on a result of the processing.

35. A photoelectric conversion apparatus comprising:
a pixel including a photoelectric conversion portion;
an accumulation portion configured to accumulate a signal charge generated in the photoelectric conversion portion in a location other than the photoelectric conversion portion;
an analog-to-digital conversion circuit configured to perform an analog-to-digital conversion on a signal based on the signal charge generated in the photoelectric conversion portion; and an output circuit,
wherein the output circuit reads out a first signal based on a first signal charge accumulated in the photoelectric conversion portion during an electric charge accumulation period and a second signal based on a second signal charge accumulated in the accumulation portion during the electric charge accumulation period, and
wherein conversion resolutions for analog-to-digital conversion to be performed on the first and second signals are different.

36. An image capturing system comprising:
a photoelectric conversion apparatus according to claim 35; and
a processing apparatus configured to perform processing on a signal output from the photoelectric conversion apparatus.

37. A moving body comprising:
a photoelectric conversion apparatus according to claim 35;
a processing apparatus configured to perform processing on a signal output from the photoelectric conversion apparatus; and
a control unit configured to control the moving body based on a result of the processing.

* * * * *